(12) United States Patent
Ando et al.

(10) Patent No.: US 8,384,996 B2
(45) Date of Patent: Feb. 26, 2013

(54) DOUBLE IMAGE PICKUP OPTICAL SYSTEM AND IMAGE PICKUP APPARATUS PROVIDED THEREWITH

(75) Inventors: Takamasa Ando, Osaka (JP);
Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 12/997,955

(22) PCT Filed: Jun. 12, 2009

(86) PCT No.: PCT/JP2009/002687
§ 371 (c)(1),
(2), (4) Date: Dec. 14, 2010

(87) PCT Pub. No.: WO2009/153953
PCT Pub. Date: Dec. 23, 2009

(65) Prior Publication Data
US 2011/0096400 A1 Apr. 28, 2011

(30) Foreign Application Priority Data
Jun. 16, 2008 (JP) ................................. 2008-157073

(51) Int. Cl.
*G02B 5/18* (2006.01)
*G02B 27/44* (2006.01)

(52) U.S. Cl. ..................... 359/566; 359/569; 359/793

(58) Field of Classification Search .................. 359/565, 359/566, 569, 753, 793
See application file for complete search history.

(56) References Cited

U.S. PATENT DOCUMENTS

| 5,768,030 | A | | 6/1998 | Estelle et al. |
|---|---|---|---|---|
| 5,978,158 | A | | 11/1999 | Nagata |
| 5,978,159 | A | | 11/1999 | Kamo |
| 6,055,105 | A | * | 4/2000 | Boku et al. ............. 359/566 |
| 6,097,551 | A | * | 8/2000 | Kreitzer ................ 359/793 |

FOREIGN PATENT DOCUMENTS

| JP | 10-090596 A | 4/1998 |
|---|---|---|
| JP | 10-111449 A | 4/1998 |
| JP | 10-115777 A | 5/1998 |
| JP | 10-161020 A | 6/1998 |

(Continued)

OTHER PUBLICATIONS

International Search Report for corresponding International Application No. PCT/JP2009/002687 mailed Jul. 28, 2009.

(Continued)

*Primary Examiner* — Audrey Y Chang
(74) *Attorney, Agent, or Firm* — Renner, Otto, Boisselle & Sklar, LLP

(57) ABSTRACT

According to the present invention, a small-sized double-lens imaging optical system whose chromatic aberration is corrected even at a super wide angle of 150° or more can be provided. The double-lens imaging optical system of the present invention includes a concave lens, and a convex lens having a diffraction grating provided thereon, and satisfies the following conditional expression (1):

$$4.5 < P1 = (1 - f/f_a) \cdot v_d < 9.0 \qquad (1).$$

Herein, f is an effective focal length of the double-lens imaging optical system; $f_a$ is an effective focal length of the double-lens imaging optical system excluding the diffraction grating; and $v_d$ is an Abbe number of the material of the convex lens with respect to the d-line. As a result, chromatic aberration can be well corrected even with respect to rays entering at high angles of view.

9 Claims, 16 Drawing Sheets

FOREIGN PATENT DOCUMENTS

| | | |
|---|---|---|
| JP | 11-084229 A | 3/1999 |
| JP | 11-295591 A | 10/1999 |
| JP | 200-028913 A | 1/2000 |
| JP | 2001-504949 T | 4/2001 |
| JP | 2005-128273 A | 5/2005 |
| JP | 2007-333883 A | 12/2007 |

OTHER PUBLICATIONS

Form PCT/ISA/237 for International Application No. PCT/JP2009/002687 dated Jul. 28, 2009 and partial English translation.

IPRP for International Application No. PCT/JP2009/002687 dated Jun. 1, 2010.

\* cited by examiner (a) CHROMATIC ABERRATION (SPHERICAL ABERRATION DIAGRAM)

(b) CURVATURE OF FIELD (ASTIGMATISM DIAGRAM)

CHROMATIC ABERRATION
(SPHERICAL ABERRATION DIAGRAM)

CURVATURE OF FIELD
(ASTIGMATISM DIAGRAM)

(a) CHROMATIC ABERRATION (SPHERICAL ABERRATION DIAGRAM)

(b) CURVATURE OF FIELD (ASTIGMATISM DIAGRAM)

CHROMATIC ABERRATION
(SPHERICAL ABERRATION DIAGRAM)

CURVATURE OF FIELD
(ASTIGMATISM DIAGRAM)

DOUBLE IMAGE PICKUP OPTICAL SYSTEM AND IMAGE PICKUP APPARATUS PROVIDED THEREWITH

TECHNICAL FIELD

The present invention relates to an imaging optical system and an imaging device having the same, and more particularly to a super wide angle lens which is small and of which chromatic aberration is well corrected even at a high angle of view.

BACKGROUND ART

Small and wide-angle imaging optical systems are being desired for onboard applications and monitoring applications. However, in an optical system which only has aspheric lenses, the number of lenses becomes as many as 5 or more, thus inducing a problem of elongated optical length as well as a problem of material cost. As a method of reducing the number of lenses, lens constructions using diffraction gratings have been proposed (see Patent Documents 1, 2, and 3). A diffraction grating has inverse dispersion and anomalous dispersion, and has a considerable chromatic aberration correction ability.

Patent Document 1 proposes a triple-lens construction utilizing a chromatic aberration correction ability of a diffraction grating(s). Further reduced in number therefrom, Patent Document 2 proposes a double wide angle imaging lens construction. Patent Document 3 proposes a lens such that a ratio between the focal length of the optical system and the focal length of a diffraction grating is adjusted so as to correct a chromatic aberration.

CITATION LIST

Patent Literature

[Patent Document 1] Japanese Laid-Open Patent Publication No. 10-111449
[Patent Document 2] Japanese Laid-Open Patent Publication No. 2005-128273
[Patent Document 3] Japanese Laid-Open Patent Publication No. 2000-28913

SUMMARY OF INVENTION

Technical Problem

However, although reduced in number, Patent Document 1 still employs a lens construction of triple or more, thus resulting in a high material and/or assembling cost. There is also a problem of elongated optical length.

In Patent Document 2, although a double construction, a lens with an angle of view only up to 140° is disclosed, and lenses with any wider angles are not suggested. According to a study by the inventors, when the lens disclosed in Patent Document 2 is used, a ray entering at a high angle of view of 140° or more generates substantial chromatic aberration. Therefore, the double lens construction disclosed in Patent Document 2 cannot achieve imaging with a super wide angle of 150° or more, for example.

In Patent Document 3, although the ratio between the focal length of the optical system and the focal length of a diffraction grating is adjusted for correction of chromatic aberration, this is meant for a lens construction with a low angle of view, i.e., an angle of view of 70° or less, and thus is not applicable to imaging with a super wide angle. Moreover, since the lens construction is triple or more, there is a problem in that the optical length will become longer as the material and assembling costs become higher.

The present invention provides an imaging optical system with a super wide angle, whose chromatic aberration is well corrected although having an optical system with two lenses, and an imaging device having the same.

Solution to Problem

A double-lens imaging optical system according to the present invention is a double-lens imaging optical system comprising: a concave lens; and a convex lens having a diffraction grating provided thereon, wherein the double-lens imaging optical system satisfies the following expression (1):

$$4.5 < P1 = (1 - f/f_a) \cdot v_d < 9.0 \tag{1},$$

where f is an effective focal length of the double-lens imaging optical system; $f_a$ is an effective focal length of the double-lens imaging optical system excluding the diffraction grating; and $v_d$ is an Abbe number of a material of the convex lens with respect to the d-line.

In one embodiment, the double-lens imaging optical system satisfies the following expression (2):

$$5.0 < P1 = (1 - f/f_a) \cdot v_d < 7.3 \tag{2}.$$

In one embodiment, the double-lens imaging optical system satisfies the following expression (3):

$$5.2 < P1 = (1 - f/f_a) \cdot v_d < 6.8 \tag{3}.$$

In one embodiment, the concave lens is a meniscus concave lens.

In one embodiment, the meniscus concave lens satisfies the following expression (4):

$$2.8 < P2 = (Cl_1/Cl_2) \cdot n_{d1} < 4.5 \tag{4},$$

where $Cl_1$ is an effective radius of an imaging target-side surface of the meniscus concave lens; $Cl_2$ is an effective radius of an image-side surface of the meniscus concave lens; and $n_{d1}$ is a refractive index of the meniscus concave lens with respect to the d-line.

In one embodiment, the meniscus concave lens satisfies the following expression (5):

$$n_{d1} > 1.5 \tag{5}.$$

In one embodiment, the double-lens imaging optical system satisfies the following expression (6):

$$P3 = h/[(1 - |Ds|/100) \cdot f] > 3.4 \tag{6},$$

where h is an image height; and Ds is a distortion value of the double-lens imaging optical system.

In one embodiment, the concave lens is made of a glass material.

In one embodiment, surfaces of the concave lens are both spherical-shaped.

In one embodiment, the diffraction grating is provided on one of two surfaces of the convex lens, and not on the other surface.

An imaging device according to the present invention is characterized by comprising: the above double-lens imaging optical system; a diaphragm defining an angle of view and an incident light amount of the double-lens imaging optical system; and an imaging element on which to receive an image formed by the double-lens imaging optical system.

Advantageous Effects of Invention

According to the present invention, a super wide angle of 150° or more can be realized with an optical system having two lenses. Since the number of lenses is two, downsizing can be realized, and cost can be reduced. According to the present invention, an imaging device which realizes downsizing and a wide field of view can be provided. The present invention is applicable to wide range of applications, such as surveillance cameras for onboard or crime prevention use to be utilized for monitoring the surroundings or the like.

DESCRIPTION OF EMBODIMENTS

Hereinafter, embodiments of the present invention will be described with reference to the drawings.

Figure 1:
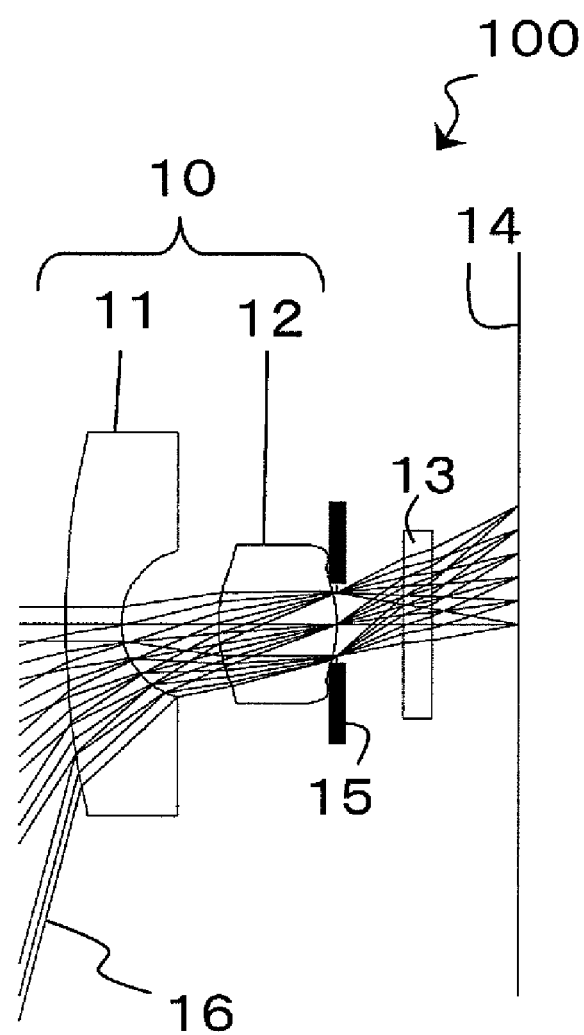
FIG. 1 A cross-sectional view showing an imaging device according to an embodiment of the present invention.

FIG. 1 is a cross-sectional view showing an imaging device 100 according to an embodiment of the present invention. The imaging device 100 includes a double-lens imaging optical system 10, a cover glass 13, an imaging element 14, and a diaphragm 15. The double-lens imaging optical system 10 includes two lenses: a concave lens 11 and a convex lens 12. The concave lens 11 is disposed at the side of an object which is the imaging target (the left-hand side in FIG. 1), whereas the convex lens 12 is disposed at the imaging element 14 side. The cover glass 13 protects the surface of the imaging element 14. The diaphragm 15 defines an angle of view and an incident light amount of the double-lens imaging optical system 10.

Light 16 entering the imaging device 100 from the imaging target is transmitted through the concave lens 11, the convex lens 12, and the cover glass 13, and observed as an image on the imaging element 14.

In order to reduce the aberration occurring in a lens, it is desirable to reduce the incident angle and refraction angle of rays entering the lens surface. By disposing the diaphragm 15 at the image plane side of the convex lens 12, the incident angle and refraction angle of rays upon the lens surface (in particular a meniscus concave lens) can be reduced, even for rays entering at a high angle of view. It is desirable that the diaphragm 15 is disposed in the neighborhood of the object side or the image plane side of the convex lens 12.

A diffraction grating having a positive power is added on at least one surface of the convex lens 12, thus making it possible to correct the chromatic aberration of the lens occurring within a refraction system.

Figure 2:
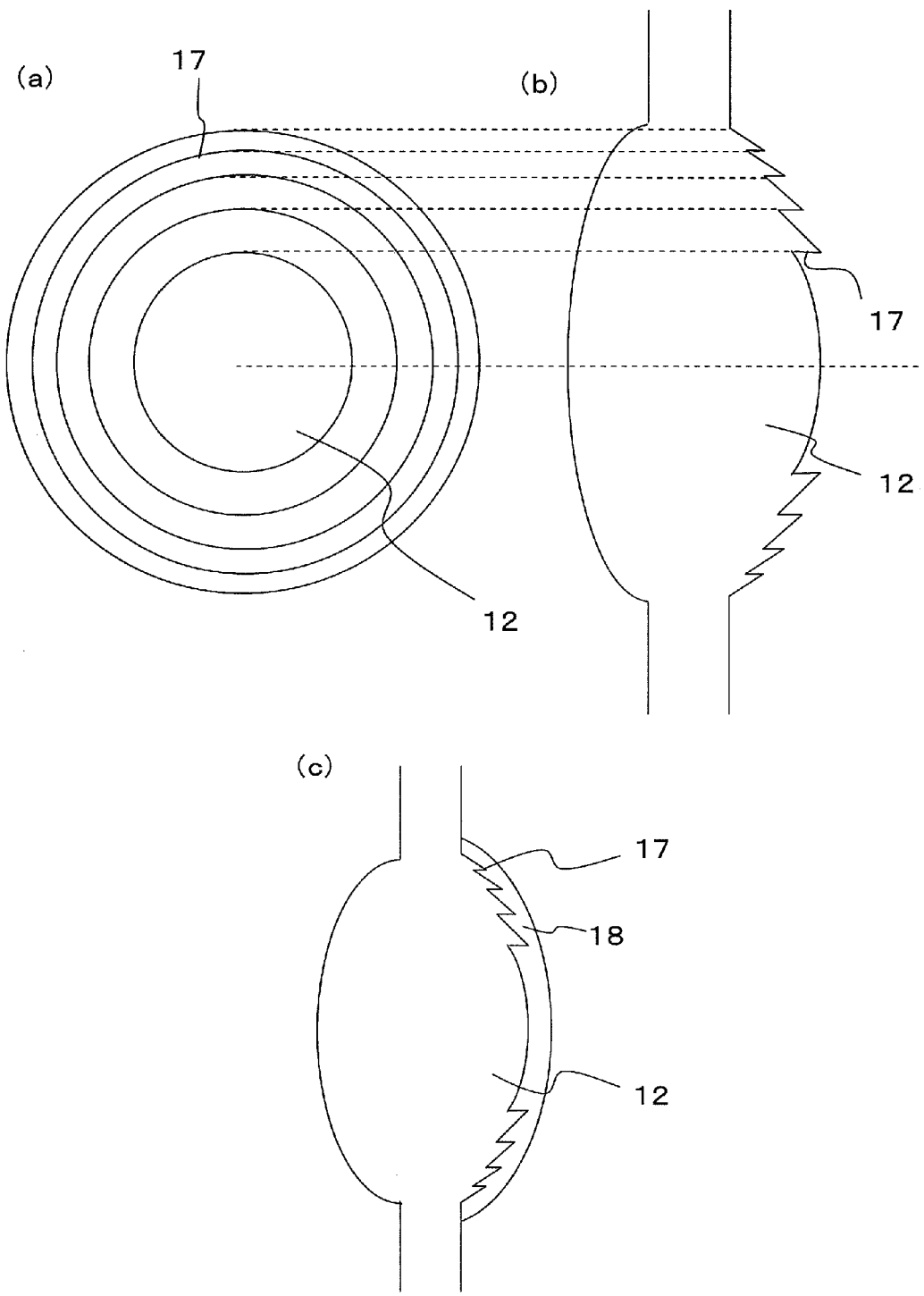
FIG. 2 (a) is a plan view of a convex lens having a diffraction grating thereon; (b) is a cross-sectional view of the convex lens with the diffraction grating formed thereon; and (c) is a cross-sectional view of a convex lens the surface of whose diffraction grating is covered with a protection film.

FIG. 2(a) is a plan view of the convex lens 12 with a diffraction grating 17 formed thereon, whereas FIG. 2(b) is a cross-sectional view of the convex lens 12 with the diffraction grating 17 formed thereon. As shown in FIG. 2(a), a diffraction grating 17 is formed in concentric circles upon the convex lens 12. Although the diffraction grating 17 is formed only one surface of the convex lens 12 in the example shown in FIG. 2(b), it may be formed on both surfaces. Note that the surface of the diffraction grating 17 may be covered with a protection film 18, as shown in FIG. 2(c).

Figure 3:
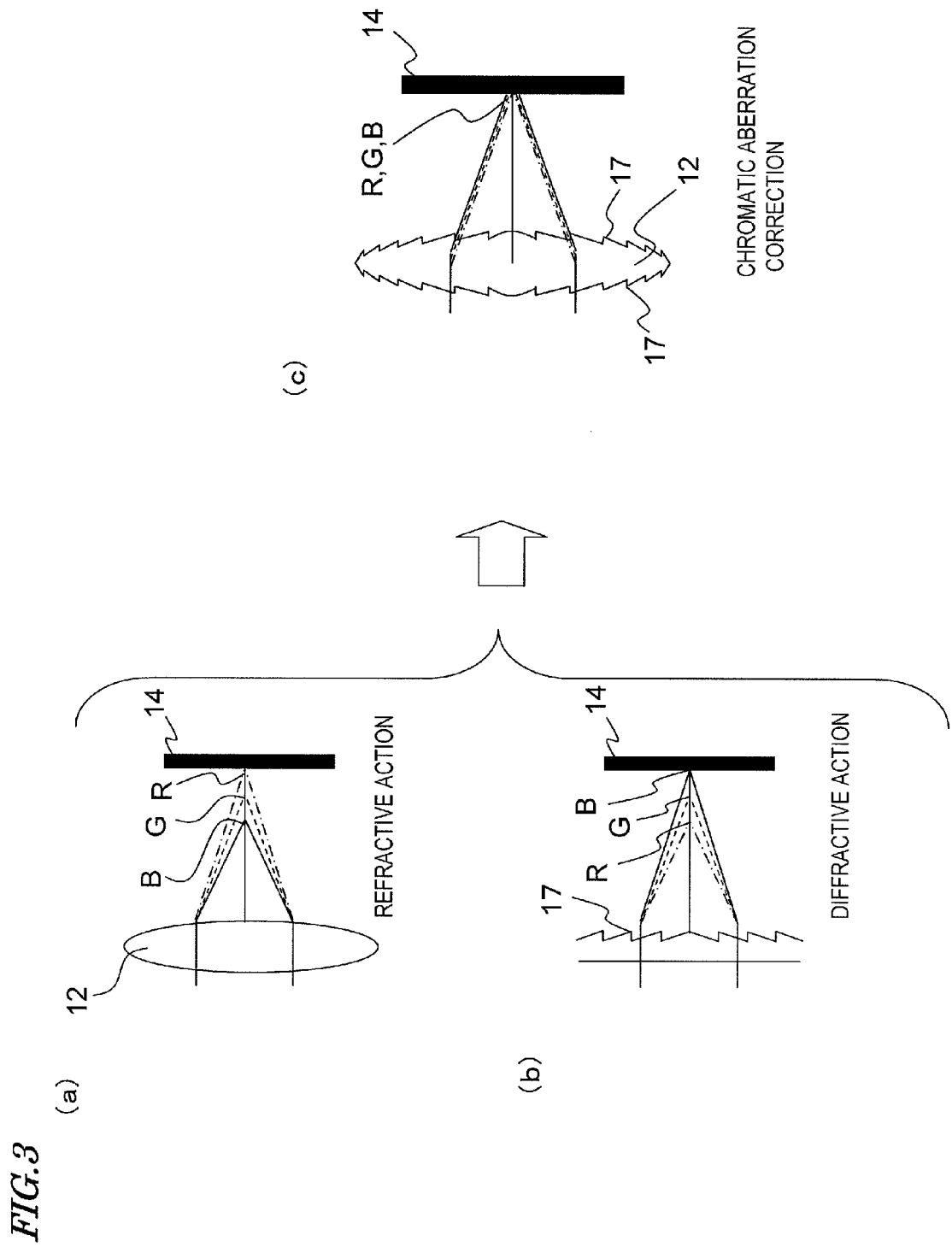
FIG. 3 (a) is a diagram showing light being refracted by a convex lens lacking a diffraction grating; (b) is a diagram showing light being diffracted by a diffraction grating; and (c) is a diagram showing an image being formed by light transmitted through a convex lens having diffraction gratings formed thereon.

FIG. 3 is a diagram describing principles by which the diffraction grating 17 corrects chromatic aberration. FIG. 3(a) shows light being refracted by the convex lens 12 lacking the diffraction grating 17 (refraction system only). Due to the refractive action of the convex lens 12, within the light transmitted through the convex lens 12, light of shorter wavelengths will form an image in the vicinity of the lens, whereas light of longer wavelengths will form an image farther away from the lens. That is, among red light R, green light G, and blue light B, the blue light B forms an image closer to the convex lens 12, whereas the red light R forms an image farther from the convex lens 12. Thus, chromatic aberration occurs because of differences in the position to form an image depending on the wavelength region of light.

FIG. 3(b) shows light being diffracted by the diffraction grating 17. Due to the diffractive action of the diffraction grating 17, within the light transmitted through the diffraction grating 17, light of longer wavelengths will form an image in the vicinity of the lens, whereas light of shorter wavelengths will form an image farther away from the lens. That is, among red light R, green light G, and blue light B, the red light R forms an image closer to the diffraction grating 17, whereas the blue light B forms an image farther from the image diffraction grating 17.

Therefore, by adding the diffraction grating 17, through which the blue light B forms an image farther, to the convex lens 12, through which the blue light B forms an image closer, it becomes possible to correct the position at which the blue light B forms an image. Moreover, by adding the diffraction grating 17, through which the red light R forms an image closer, to the convex lens 12, through which the red light R forms an image farther, it becomes possible to correct the position at which the red light R forms an image. FIG. 3(c) shows an image being formed by light transmitted through the convex lens 12 having the diffraction grating 17 formed thereon. Since the diffraction grating 17 performs chromatic aberration correction, it becomes possible to allow the red light R, the green light G, and the blue light B to form an image at the same position.

By adjusting the proportion between a lens power of the entire double-lens imaging optical system 20, which includes the diffraction grating 17, and a lens power of only the refraction system, from which the diffraction grating 17 is excluded, it becomes possible to control the chromatic aberration correction. Usually, the power of a lens is defined as an inverse of its focal length. Moreover, in a double lens, greater chromatic aberration is likely to occur with higher angles of view. In order for a lens aberration to be well-corrected even in the case of rays entering at a super high angle of view of 150° or more, it is necessary to take into account the wavelength dispersion of the refractive index of the lens material as well. The wavelength dispersion of the refractive index is defined in terms of an Abbe number, such that a greater wavelength dispersion of refractive index is represented by a smaller Abbe number. Therefore, as the Abbe number decreases, the proportion which the power of the refraction system accounts for in the overall lens power must be decreased, and the proportion of the power of the diffraction grating must be increased.

The inventors have studied a relationship between Abbe number and focal length, and found that an appropriate aberration correction can be made when the relationship satisfies expression (1) below.

$$4.5 < P1 = (1 - f/f_a) \cdot v_d < 9.0 \tag{1}$$

Herein, f is an effective focal length of the double-lens imaging optical system 20; $f_a$ is an effective focal length of only the refraction system of the double-lens imaging optical system 20, from which the diffraction grating 17 is excluded; and $v_d$ is an Abbe number of the convex lens material with respect to the d-line. The effective focal lengths f and $f_a$ are those at a wavelength of 550 nm. The double-lens imaging optical system 20 satisfies expression (1).

Note that it is more preferable to satisfy the following expression (2).

$$5.0 < P1 = (1 - f/f_a) \cdot v_d < 7.3 \tag{2}$$

Furthermore, it is more preferable to satisfy the following expression (3).

$$5.2 < P1 = (1 - f/f_a) \cdot v_d < 6.8 \tag{3}$$

Herein, only the Abbe number of the convex lens 12 receives consideration as the Abbe number. When the diaphragm 15 is placed near the convex lens 12 (e.g., on the object-side surface or the image-side surface), within the light entering the concave lens 11 from the object side, the light which is led to the imaging element 14 has a small beam width. Therefore, within the incident light to the concave lens 11, so far as the light of interest is concerned, the difference in refraction angle between the upper marginal ray and the lower marginal ray at each angle of view is small. On the other hand, the beam width of a light beam entering the convex lens 12 disposed in the rear part of the optical system (image plane side) extends out to the full effective lens diameter, so that a difference in refraction angle occurs between the upper marginal ray and the lower marginal ray. Since this difference in refraction angle causes chromatic aberration, a chromatic aberration correction must be performed by giving precedence to the wavelength dispersion of refractive index (=Abbe number) of the convex lens 12. The reason why it is preferable to satisfy the numerical ranges of the aforementioned conditional expressions (1) to (3) will be described later.

It is desirable that the concave lens 11 is a so-called meniscus concave lens, whose object-(imaging target-) side surface has a convex shape. This makes it possible to reduce the incident angle of rays entering the concave lens 11 at high angles of view from the object side, whereby the reflection loss at the surface can be reduced. In this case, it is desirable that the meniscus concave lens 11 satisfies the following conditional expression (4).

$$2.8 < P2 = (Cl_1/Cl_2) \cdot n_{d1} < 4.5 \tag{4}$$

Herein, $Cl_1$ is an effective radius of the object-side surface of the meniscus concave lens 11; $Cl_2$ is an effective radius of the image-side surface of the meniscus concave lens 11; and $n_{d1}$ is a refractive index of the meniscus concave lens 11 with respect to the d-line. If the lower limit value of expression (4) is exceeded, the optical length becomes too long for any ray of 145° or above to go through the lens, such that it is no different from the optical length of multiple lenses. On the other hand, if the upper limit value of expression (4) is exceeded, the incident angle and refraction angle of rays entering the lens surface become large, thus making it difficult to reduce the aberrations.

It is more desirable that the meniscus concave lens 11 satisfies the following conditional expression (5).

$$n_{d1} > 1.5 \tag{5}$$

The role of the concave lens 11 disposed at the object side is to ensure with its high refractive power that the angle of tilt of any ray entering at a steep angle from a high angle of view becomes gentle with respect to the optical axis, thus allowing the entire lens system to reduce aberrations. Therefore, it is desirable that the concave lens 11 has a high refractive index. When $n_{d1}$ is equal to or less than the lower limit value of expression (5), i.e., 1.5, it is necessary for the object-side surface of the concave lens 11 to be a concave surface in order to augment the refractive power at high angles of view.

Moreover, it is desirable that the double-lens imaging optical system 10 satisfies the following conditional expression (6).

$$P3 = h/[(1-|Ds|/100) \cdot f] > 3.4 \tag{6}$$

Herein, h is an image height; and Ds is a distortion value of the double-lens imaging optical system 10. With a design that satisfies this condition, a lens with a super wide angle of 150° or more can be realized.

Since the concave lens 11 is disposed at the object side, it is desirable that the concave lens 11 is composed of a glass material. The reason is that glass has a high hardness as compared to resin materials and the like, and therefore is immune to impact such as contact from the exterior.

In the case where the concave lens 11 is composed of a glass material, it is desirable that both surfaces are spherical-shaped. If they are spherical-shaped, they can be produced through a polishing process, thus resulting in a lower cost than in the case of a press forming or cutting process.

Moreover, in the case where the concave lens 11 is a meniscus concave lens, it is desirable that the concave surface of the meniscus concave lens 11 has an effective radius which is larger than the depth of the concave surface. By giving the meniscus concave lens 11 a thin profile, it becomes possible to reduce the material cost and facilitate lens processing. Moreover, warp of the meniscus concave lens 11 can be reduced, while enhancing its strength. Moreover, reducing the thickness of the meniscus concave lens 11 makes it possible to render the double-lens imaging optical system 10 thinner.

Although diffraction gratings 17 may be introduced on both surfaces of the convex lens 12, it is desirable that a diffraction grating 17 be disposed on only one of the surfaces. While the diffraction grating 17 is able to provide a 100% diffraction efficiency for light of a specific wavelength, its efficiency will decrease for light of any other wavelength region. Therefore, for use in an imaging application, it is desirable to introduce a diffraction grating 17 only on one surface in order to suppress the decrease in diffraction efficiency. Introducing a diffraction grating only on one surface also provides cost advantages because it will promote ease of production as compared to introducing diffraction gratings on both surfaces.

With a view to improving the diffraction efficiency in the white region, a film material having a refractive index under some specific conditions may be introduced on the diffraction grating 17.

Moreover, an aspheric shape of a lens is represented by the following aspheric formula (7).

$$z = \frac{ch^2}{1+\sqrt{1-(K+1)c^2h^2}} + Ah^4 + Bh^6 + Ch^8 + Dh^{10} + Eh^{12} \tag{7}$$

$$(h^2 = x^2 + y^2)$$

Expression (7) is an equation representing an aspheric surface when rotated around a z axis which is perpendicular to an x-y plane, where c is a center of curvature, and A, B, C, D, and E are coefficients representing offsets from the quadric surface. It suffices if the coefficients are provided up to E; however, they may go up to a greater order, or a smaller order, and are arbitrary. Depending on the K value, the following aspheric surfaces will be obtained:
when K>0, an ellipsoid whose short radius is the optical axis;
when K=0, a spherical surface;
when −1<K<0, an ellipsoid whose long radius is the optical axis;
when K=−1, a paraboloid; and
when K<−1, a hyperboloid.

Moreover, the diffraction surface of the lens is designed by using the phase function method. The phase function method assumes that a diffraction grating is on the lens surface, and performs a phase conversion of the wavefront as expressed by the following expression (8) on that surface.

$$\phi(h) = \frac{2\pi}{\lambda}\psi(h) \tag{8}$$

$$\psi(h) = a_2 h^2 + a_4 h^4 + a_6 h^6 + a_8 h^8 + a_{10} h^{10}$$

$$(h^2 = x^2 + y^2)$$

Herein, $\phi$ is a phase function; $\Psi$ is an optical path difference function; h is a distance along a radial direction; and $a_2$, $a_4$, $a_6$, $a_8$, and $a_{10}$ are coefficients. It suffices if the coefficients are provided up to $a_{10}$; however, they may go up to a greater order, or a smaller order, and are arbitrary. The order of diffraction is the $1^{st}$ order.

In the actual fabrication, based on the phase function, an amount of sag of the diffraction grating is calculated from a refractive index difference and a design wavelength of the material, and thus the diffraction grating is formed on the substrate surface.

Hereinafter, specific Examples of the present invention will be described. Note that the present invention is not limited to these Examples.

Example 1

Figure 4:
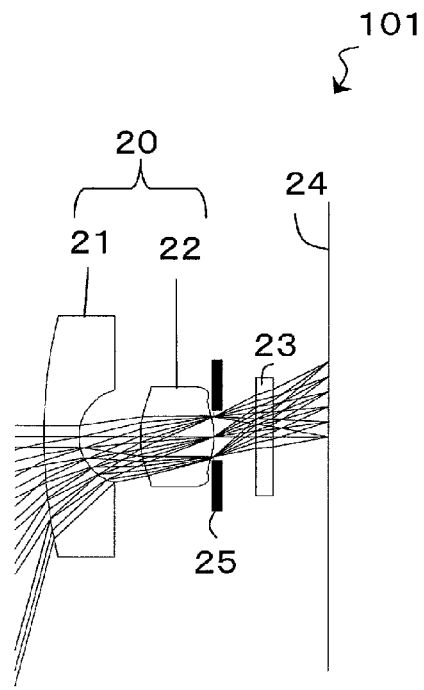
FIG. 4 A cross-sectional view showing an imaging device according to Example 1 of the present invention.

FIG. 4 is a cross-sectional view showing an imaging device 101 of Example 1. The imaging device 101 includes a double-lens imaging optical system 20, a cover glass 23, an imaging element 24, and a diaphragm 25. The double-lens imaging optical system 20 includes two lens, i.e., a concave lens 21 and a convex lens 22.

The diaphragm 25 is disposed on the image plane side of the convex lens 22, and a diffraction grating 17 (FIG. 2) is formed on the envelope of the aspheric surface at the image side of the convex lens 22. The concave lens 21 is made of a glass material for enhanced impact resistance.

Numerical data of the imaging device 101 of Example 1 is shown below. In the following data, ω is a total angle of view;

Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=150°
Fno=2.8
L=8.6 mm
f=1.8456 mm
$f_a$=2.3555 mm
$Cl_1$=3.090 mm
$Cl_2$=1.389 mm
h=2.25 mm
Ds=−67.3%

| surface number | R | t | $n_d$ | $v_d$ |
|---|---|---|---|---|
| 1 | 16.09058 | 1.052185 | 1.689175 | 49.9 |
| 2 | 1.439873 | 1.841324 | | |
| 3 | 2.559651 | 2.230632 | 1.585000 | 27.9 |
| 4 | −2.36292 | 0.000000 | | |
| 5 (diaphragm) | infinite | 1.262623 | | |
| 6 | infinite | 0.550930 | BK7 | |
| 7 | infinite | 1.638462 | | |

(aspheric coefficient of third surface)

κ = 0
A = −0.0189257
B = 0.00394453
C = −0.00835334
D = 0.00196203

(aspheric coefficient of fourth surface)

κ = 0
A = 0.0382578
B = −0.167936
C = 0.251343
D = −0.0818271

(phase factor of fourth surface)

m = 1
design wavelength λ = 538 nm
$a_2$ = −0.0321500
$a_4$ = −0.00920476
$a_6$ = 0.0948648
$a_8$ = −0.127040
$a_{10}$ = 0.00954808

From the above numerical data,
P1=6.04;
P2=3.76; and
P3=3.73, indicating that conditional expression (1) is satisfied.

Figure 5:
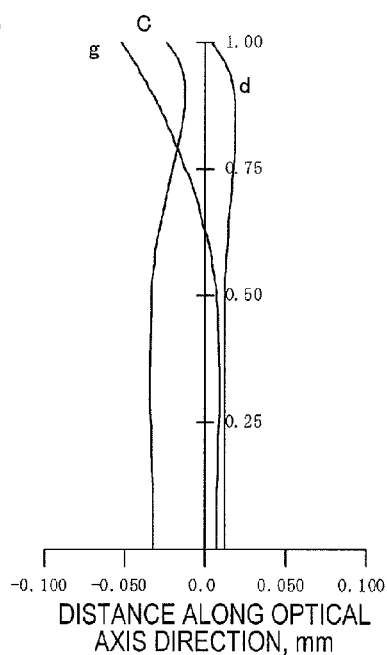
FIG. 5 (a) is a spherical aberration diagram of an imaging device according to Example 1 of the present invention; and (b) is an astigmatism diagram of an imaging device according to Example 1 of the present invention.
Figure 5:
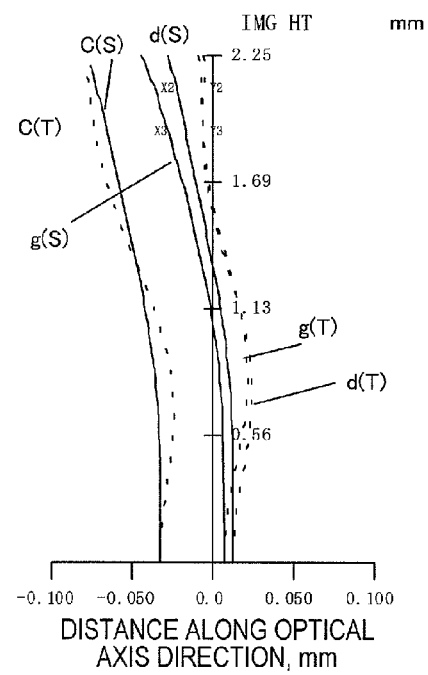

FIG. 5(a) is a spherical aberration diagram showing the chromatic aberration of Example 1; and FIG. 5(b) is an astigmatism diagram showing the amount of curvature of field of Example 1. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 5(b), it can be confirmed that the chromatic aberration is corrected even at high angles of view.

Figure 6:
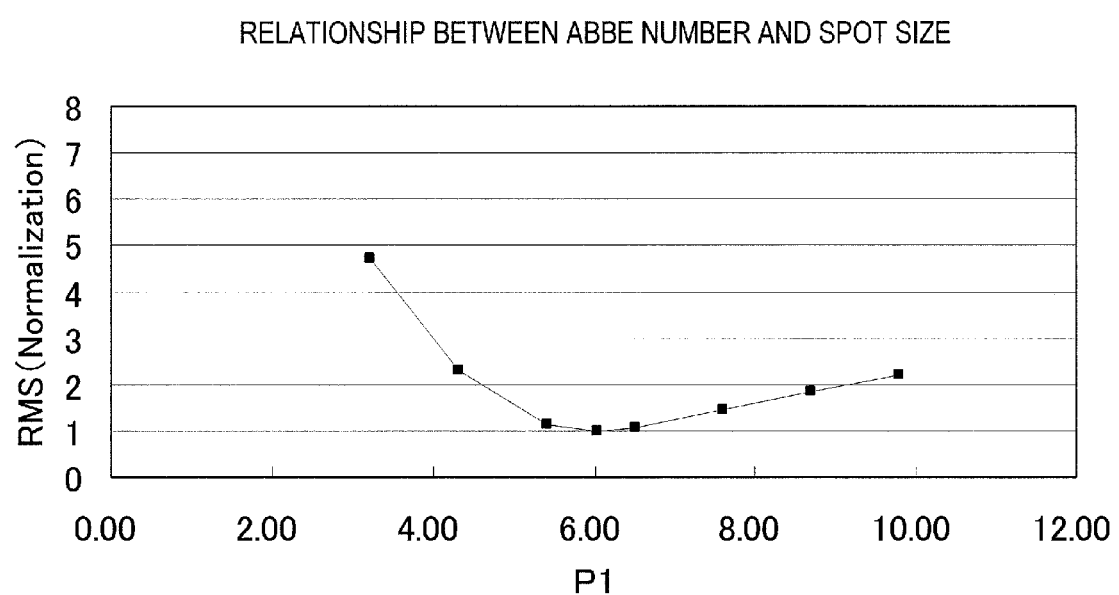
FIG. 6 A graph showing a relationship between RMS values and P1 values of a spot size of an imaging device according to Example 1 of the present invention.

FIG. 6 is a diagram showing a relationship between the Abbe number and the spot size in Example 1. FIG. 6 shows changes in an RMS value (root mean square) of the spot size (diameter), where the Abbe number of the convex lens 22 is varied while the power of the entire double-lens imaging optical system 20 and the power of the double-lens imaging optical system 20 excluding the diffraction grating 17 are kept constant. As an angle of view with which to evaluate the spot size, a 70% image height may well be used as a representative value because, if the performance up to the 70% image height is good, a generally satisfactory performance is obtained also for the entire image. In the evaluation, the number of rays passing through the entrance pupil is 80, and the wavelengths are 640:550:440=1:2:1. The vertical axis shows an RMS value of the spot size as normalized based on its minimum value. The horizontal axis represents the P1 value in conditional expression (1). The RMS value is a 1Γ value of a ray passing through the entrance pupil; a smaller RMS value indicates a better lens performance; and an ideal design is where the RMS value of the spot size equals the pixel size (1 pixel) of the imaging element. In the present Example, too, the imaging element is selected so that the size of one pixel equals the minimum value of the RMS value of the spot size. Although the pixel size to be selected will vary depending on the purpose for which the imaging device is used, the present invention is applicable irrespectively of the pixel size.

From FIG. 6, by prescribing the P1 value so that 4.5<P1<9.0, it is ensured that the specification limit for the RMS value is 2 or less. The specification limit for the RMS value being 2 means that the spot size is twice as large as its reference value. Usually, the spot is designed so as to fit within one pixel; if it should become 2 pixels or more, the size will extend beyond the center positions of the adjoining pixels on both sides, thus resulting in an increased influence on the adjoining pixels, which is unpreferable. Therefore, the specification limit for the RMS value must be 2 or less. That is, if P1 is equal to or greater than 9.0, the specification limit for the RMS value becomes too large, thus resulting in a deteriorated performance as an imaging lens. This is because the wavelength dispersion of refractive index of the material of the convex lens 22 is small, and the chromatic aberration correction is excessive. On the other hand, if P1 is equal to or less than 4.5, the specification limit for the RMS value also becomes too large, thus resulting in a deteriorated performance as an imaging lens. This is because of insufficiency of chromatic aberration correction.

By prescribing the P1 value so that 5.0<P1<7.3, it is ensured that the specification limit for the RMS value is less than about 1.5, whereby chromatic aberration can be better reduced. This renders the chromatic aberration affecting the adjoining pixels no longer conspicuous. Furthermore, by prescribing the P1 value so that 5.2<P1<6.8, it is ensured that the specification limit for the RMS value is less than about 1.2, whereby a better chromatic aberration correction is realized. Since this makes it possible to reduce the decrease in resolution to within 5 to 15% of the optimum state (the RMS value being 1), a good lens performance close to that in the optimum state is obtained.

Example 2

Figure 7:
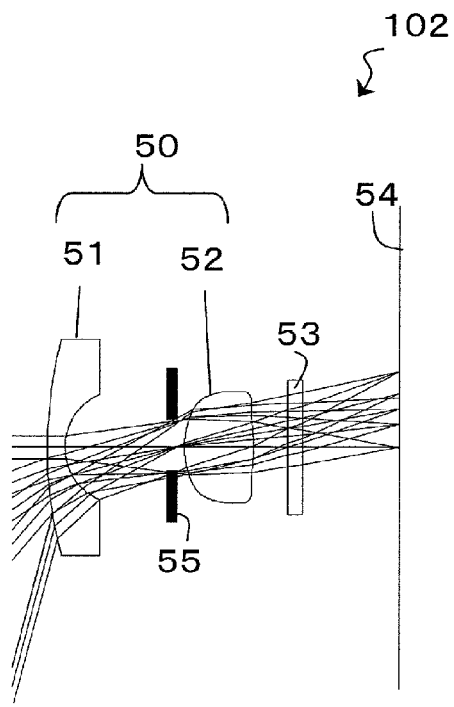
FIG. 7 A cross-sectional view showing an imaging device according to Example 2 of the present invention.

FIG. 7 is a cross-sectional view showing an imaging device 102 of Example 2. The imaging device 102 includes a double-lens imaging optical system 50, a cover glass 53, an imaging element 54, and a diaphragm 55. The double-lens imaging optical system 50 includes two lenses, i.e., a concave lens 51 and a convex lens 52.

The diaphragm 55 is disposed on the object side of the convex lens 52, and a diffraction grating 17 (FIG. 2) is formed on the envelope of the aspheric surface at the image side of the convex lens 52. By disposing the diaphragm 55 between the concave lens 51 and the convex lens 52, the incident angle of light entering the imaging element 54 can be reduced. The concave lens 51 is made of a glass material for enhanced impact resistance.

Numerical data of the imaging device 102 of Example 2 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=150°
Fno=2.8
L=10.4 mm
f=1.9004 mm
$f_a$=2.4288 mm
$Cl_1$=2.692 mm
$Cl_2$=1.550 mm
h=2.25 mm
Ds=−68.3%

| surface number | R | t | $n_d$ | $v_d$ |
|---|---|---|---|---|
| 1 | 12.35704 | 0.519999 | 1.77250 | 49.62 |
| 2 | 1.686732 | 3.29229 | | |
| 3 (diaphragm) | infinite | 0.241345 | | |
| 4 | 2.655821 | 2.047438 | 1.585000 | 27.9 |
| 5 | −4.63202 | 1.010682 | | |
| 6 | infinite | 0.440999 | BK7 | |
| 7 | infinite | 2.845853 | | |

(aspheric coefficient of fourth surface)

κ = −0.796834
A = −0.00670146
B = 0.0380988
C = −0.0364111
D = 0.0132840
E = 5.82320e−016
(aspheric coefficient of fifth surface)

κ = 3.749992
A = 0.0670042
B = −0.0758092

C = 0.0621387
D = −0.0152972
E = 5.824155e−016
(phase factor of fifth surface)

m = 1
design wavelength λ = 538 nm
$a_2$ = −0.0256517
$a_4$ = −0.0252208
$a_6$ = 0.0497239
$a_8$ = −0.0376587
$a_{10}$ = 0.00965820

From the above numerical data,
P1=6.07;
P2=3.08; and
P3=3.73, indicating that conditional expression (1) is satisfied.

Figure 8:
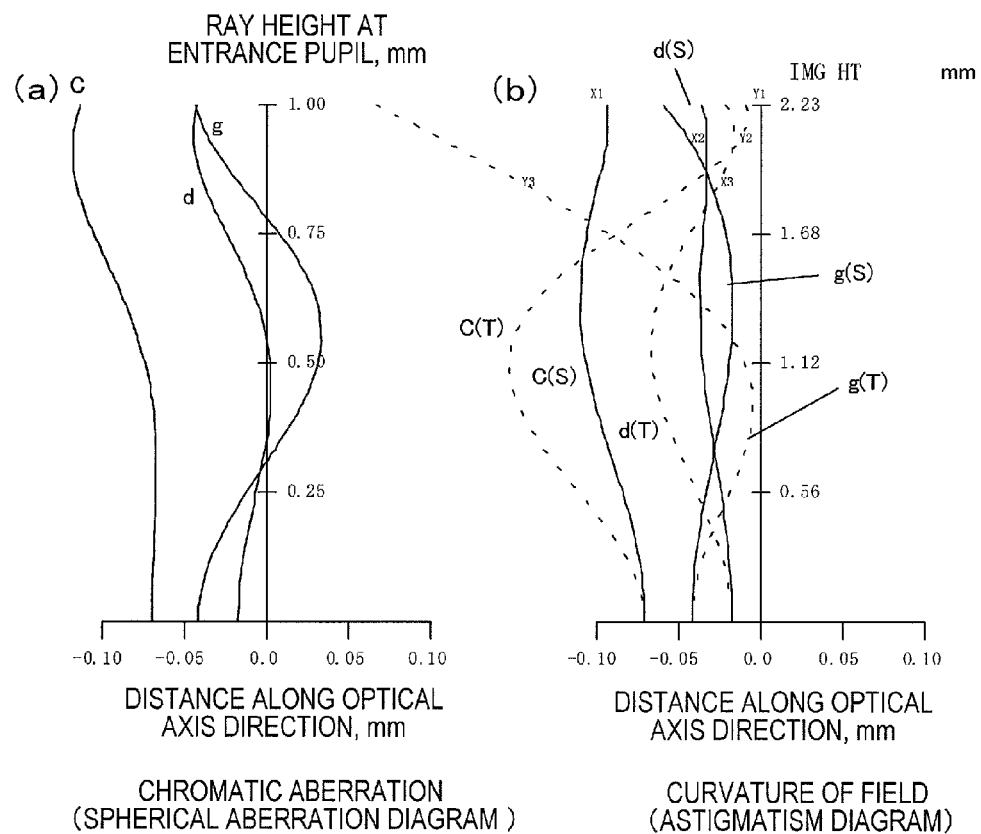
FIG. 8 (a) is a spherical aberration diagram of an imaging device according to Example 2 of the present invention; and (b) is an astigmatism diagram of an imaging device according to Example 2 of the present invention.

FIG. 8(a) is a spherical aberration diagram showing the chromatic aberration of Example 2; and FIG. 8(b) is an astigmatism diagram showing the amount of curvature of field of Example 2. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 8(b), it can be confirmed that the chromatic aberration is corrected even at high angles of view.

In Example 2, too, results similar to those of Example 1 were obtained regarding the changes in the RMS value of the spot size when the Abbe number of the convex lens 52 was varied, i.e., when the value of the constant P1 was varied.

Example 3

Figure 9:
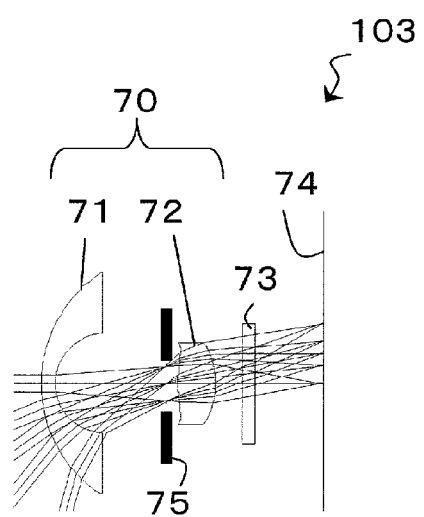
FIG. 9 A cross-sectional view showing an imaging device according to Example 3 of the present invention.

FIG. 9 is a cross-sectional view showing a imaging device 103 of Example 3. The imaging device 103 includes a double-lens imaging optical system 70, a cover glass 73, an imaging element 74, and a diaphragm 75. The double-lens imaging optical system 70 includes two lenses, i.e., a concave lens 71 and a convex lens 72.

The diaphragm 75 is disposed on the object side of the convex lens 72. By disposing the diaphragm 75 between the concave lens 71 and the convex lens 72, the incident angle of light entering the imaging element 74 can be reduced. Diffraction gratings 17 (FIG. 2) are formed on the envelopes of the aspheric surfaces on both the object side and image side of the convex lens 72. By forming the diffraction gratings 17 on both surfaces of the convex lens 72, chromatic aberration can be corrected more efficiently. The concave lens 71 is made of a glass material for enhanced impact resistance.

Numerical data of the imaging device 103 of Example 3 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=150°
Fno=2.8
L=10.4 mm
f=1.8136 mm
$f_a$=2.2451 mm
$Cl_1$=3.559 mm
$Cl_2$=1.840 mm
h=2.25 mm
Ds=−66.8%

| surface number | R | t | $n_d$ | $v_d$ |
|---|---|---|---|---|
| 1 | 4.888790 | 0.519999 | 1.77250 | 49.62 |
| 2 | 1.841767 | 4.104826 | | |
| 3 (diaphragm) | infinite | 0.447600 | | |
| 4 | 4.624231 | 1.395179 | 1.585000 | 27.9 |
| 5 | −2.826984 | 1.010682 | | |
| 6 | infinite | 0.440999 | BK7 | |
| 7 | infinite | 2.546085 | | |

(aspheric coefficient of fourth surface)

κ = −5.314412
A = −0.00182345
B = −0.0292375
C = 0.0218586
D = −0.00746996
E = 1.503109e−015

(aspheric coefficient of fifth surface)

κ = 1.820401
A = 0.0328674
B = −0.0292150
C = 0.0188427
D = −0.00369989
E = 1.513207e−015

(phase factor of fourth surface)

m = 1
design wavelength λ = 538 nm
$a_2$ = 0.0122460
$a_4$ = 0.0130927
$a_6$ = −0.0325525
$a_8$ = 0.0188769
$a_{10}$ = −0.00433589

(phase factor of fifth surface)

m = 1
design wavelength λ = 538 nm
$a_2$ = −0.0346966
$a_4$ = −0.0110588
$a_6$ = 0.0170859
$a_8$ = −0.00954619
$a_{10}$ = 0.00205933

From the above numerical data,
P1=5.36;
P2=3.43; and
P3=3.73, indicating that conditional expression (1) is satisfied.

Figure 10:
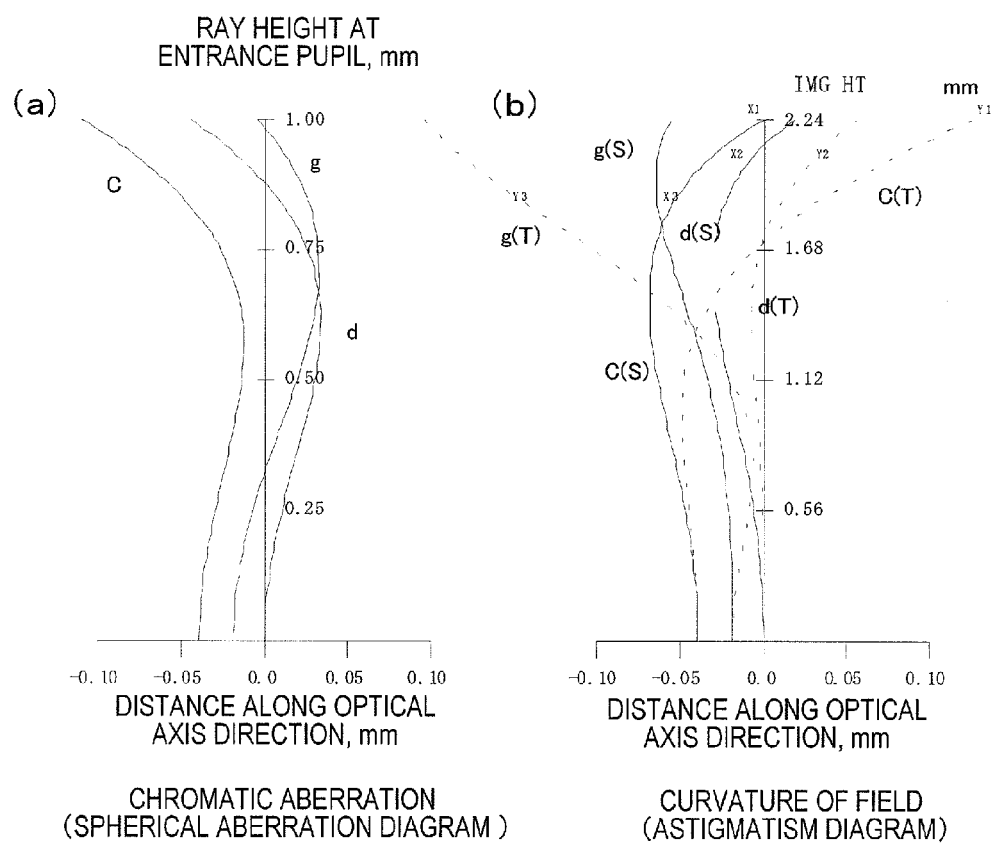
FIG. 10 (a) is a spherical aberration diagram of an imaging device according to Example 3 of the present invention; and (b) is an astigmatism diagram of an imaging device according to Example 3 of the present invention.

FIG. 10(a) is a spherical aberration diagram showing the chromatic aberration of Example 3; and FIG. 10(b) is an astigmatism diagram showing the amount of curvature of field of Example 3. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 10(b), it can be confirmed that the chromatic aberration is corrected even at high angles of view.

In Example 3, too, results similar to those of Example 1 were obtained regarding the changes in the RMS value of the spot size when the Abbe number of the convex lens 72 was varied, i.e., when the value of the constant P1 was varied.

Example 4

Figure 11:
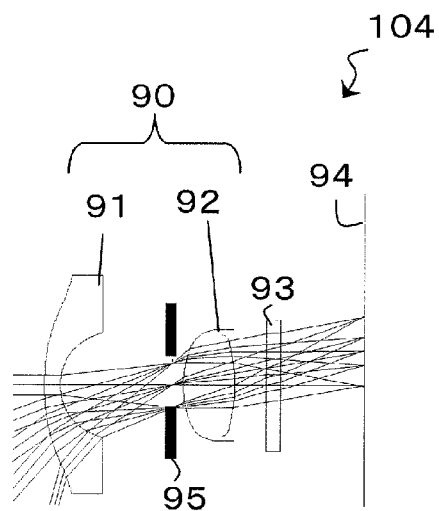
FIG. 11 A cross-sectional view showing an imaging device according to Example 4 of the present invention.

FIG. 11 is a cross-sectional view showing an imaging device 104 of Example 4. The imaging device 104 includes a double-lens imaging optical system 90, a cover glass 93, an imaging element 94, and a diaphragm 95. The double-lens imaging optical system 90 includes two lenses, i.e., a concave lens 91 and a convex lens 92.

The diaphragm 95 is disposed on the object side of the convex lens 92, and a diffraction grating 17 (FIG. 2) is formed on the envelope of the aspheric surface at the image side of the convex lens 92. By disposing the diaphragm 95 between the concave lens 91 and the convex lens 92, the incident angle of light entering the imaging element 94 can be reduced. Moreover, the concave lens 91 is an aspheric lens, which makes it possible to reduce occurrence of aberration. The concave lens 91 is made of a glass material for enhanced impact resistance.

Numerical data of the imaging device 104 of Example 4 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=150°
Fno=2.8
L=10.4 mm
f=1.8681 mm
$f_a$=2.3696 mm
$Cl_1$=3.012 mm
$Cl_2$=1.702 mm
h=2.25 mm
Ds=−67.7%

| surface number | R | t | $n_d$ | $v_d$ |
|---|---|---|---|---|
| 1 | 8.832398 | 0.519999 | 1.77250 | 49.62 |
| 2 | 1.901274 | 3.656274 | | |
| 3 (diaphragm) | infinite | 0.370350 | | |
| 4 | 3.442368 | 1.689756 | 1.585000 | 27.9 |
| 5 | −3.600489 | 1.010682 | | |
| 6 | infinite | 0.440999 | BK7 | |
| 7 | infinite | 2.720011 | | |

(aspheric coefficient of first surface)

κ = 1.376692
A = 0.0104366
B = −0.00142524
C = 7.050269e−005
D = −1.492443e−006
(aspheric coefficient of second surface)

κ = 0.0945047
A = 0.0136754
B = 0.00741570
C = −0.00234636
D = 0.000634700
(aspheric coefficient of fourth surface)

κ = −0.796834
A = −0.0130940
B = 0.0297942
C = −0.0195985
D = 0.00501894
(aspheric coefficient of fifth surface)

κ = 3.749992
A = 0.0648057
B = −0.0739190
C = 0.0527920
D = −0.0108746
(phase factor of fifth surface)

m = 1
design wavelength λ = 538 nm
$a_2$ = −0.0258178
$a_4$ = −0.0248857
$a_6$ = 0.0466234
$a_8$ = −0.0308815
$a_{10}$ = 0.00682324

From the above numerical data,
P1=5.90;
P2=3.14; and
P3=3.73, indicating that conditional expression (1) is satisfied.

Figure 12:
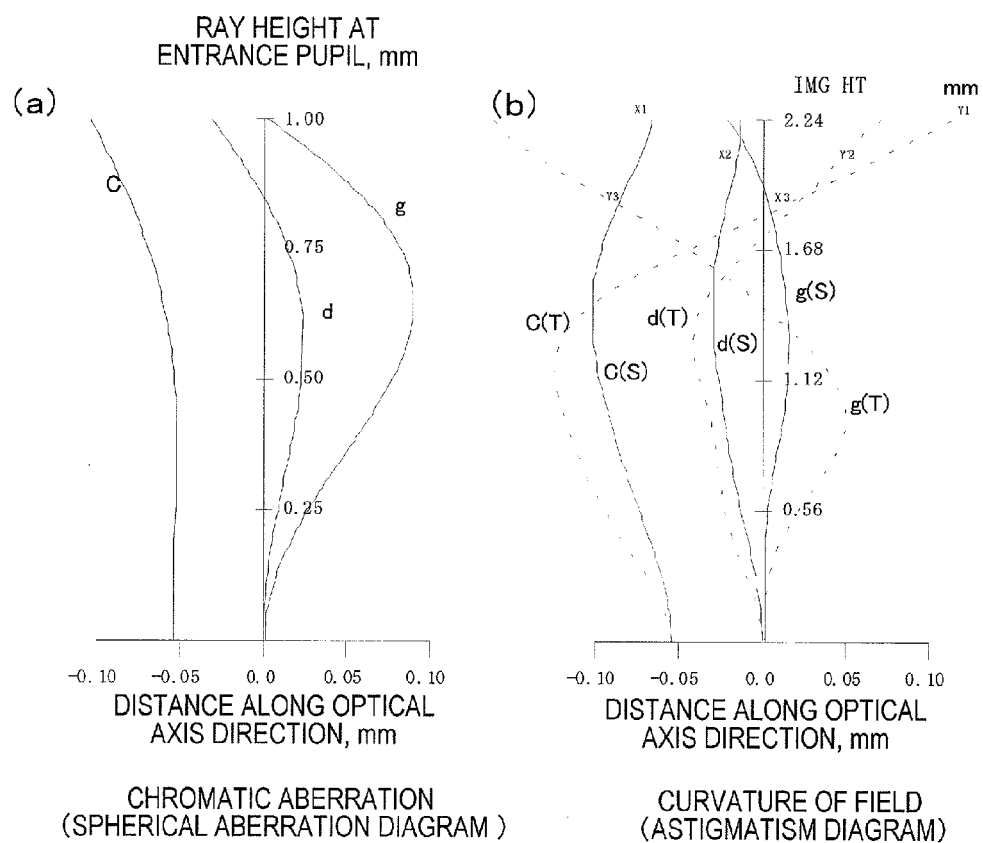
FIG. 12 (a) is a spherical aberration diagram of an imaging device according to Example 4 of the present invention; and (b) is an astigmatism diagram of an imaging device according to Example 4 of the present invention.

FIG. 12(a) is a spherical aberration diagram showing the chromatic aberration of Example 4; and FIG. 12(b) is an astigmatism diagram showing the amount of curvature of field of Example 4. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 12(b), it can be confirmed that the chromatic aberration is corrected even at high angles of view.

In Example 4, too, results similar to those of Example 1 were obtained regarding the changes in the RMS value of the spot size when the Abbe number of the convex lens 92 was varied, i.e., when the value of the constant P1 was varied.

Example 5

Figure 13:
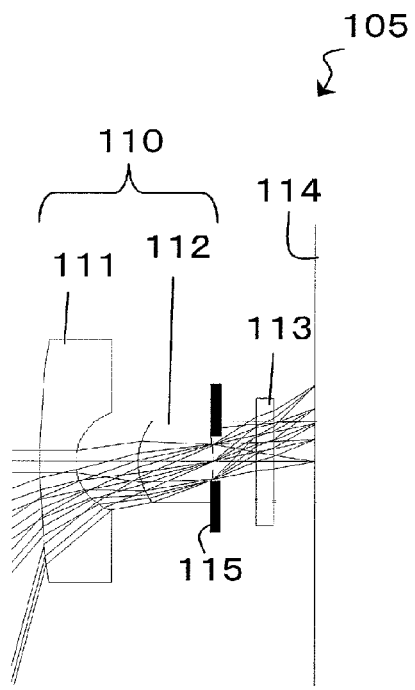
FIG. 13 A cross-sectional view showing an imaging device according to Example 5 of the present invention.

FIG. 13 is a cross-sectional view showing a imaging device 105 of Example 5. The imaging device 105 includes a double-lens imaging optical system 110, a cover glass 113, an imaging element 114, and a diaphragm 115. The double-lens imaging optical system 110 includes two lenses, i.e., a concave lens 111 and a convex lens 112.

The diaphragm 115 is disposed on the image plane side of the convex lens 112, and a diffraction grating 17 (FIG. 2) is formed on the envelope of the aspheric surface at the image side of the convex lens 112. Moreover, the concave lens 111 is made of a glass material for enhanced impact resistance.

Numerical data of the imaging device 105 of Example 5 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=151°
Fno=2.8
L=8.1 mm
f=1.8507 mm
$f_a$=2.2096 mm
$Cl_1$=3.055 mm
$Cl_2$=1.435 mm
h=2.24 mm
Ds=−68.2%

| surface number | R | t | $n_d$ | $v_d$ |
|---|---|---|---|---|
| 1 | 24.24031 | 1.052185 | 1.689175 | 49.9 |
| 2 | 1.511129 | 1.841324 | | |
| 3 | 1.778637 | 2.230632 | 1.585000 | 40.0 |
| 4 | −3.081994 | 0.000000 | | |
| 5 (diaphragm) | infinite | 1.262623 | | |
| 6 | infinite | 0.550930 | BK7 | |
| 7 | infinite | 1.181923 | | |

(aspheric coefficient of third surface)

κ = 0
A = −0.0182365
B = 0.00908549
C = −0.0139380
D = 0.00389725
(aspheric coefficient of fourth surface)

κ = 0
A = 0.0693357
B = −0.213917

-continued

```
C = 0.0126108
D = 0.604399
(phase factor of fourth surface)

m = 1
design wavelength λ = 538 nm
a₂ = -0.0279932
a₄ = -0.0130694
a₆ = 0.0691815
a₈ = 0.261774
a₁₀ = -0.768409
```

From the above numerical data,
P1=6.50;
P2=3.60; and
P3=3.81, indicating that conditional expression (1) is satisfied. Moreover, since a material having an Abbe number of 40 was used as the material of the convex lens 112, color correction by the diffraction grating 17 can be less than those in Examples 1 to 4 where a material having an Abbe number of 27.9 was used, thus resulting in a small $f_a$ value. Since the color correction by the diffraction grating 17 can be little, the number of annular zones in the diffraction grating 17 can be reduced, thus facilitating the lens processing.

Figure 14:
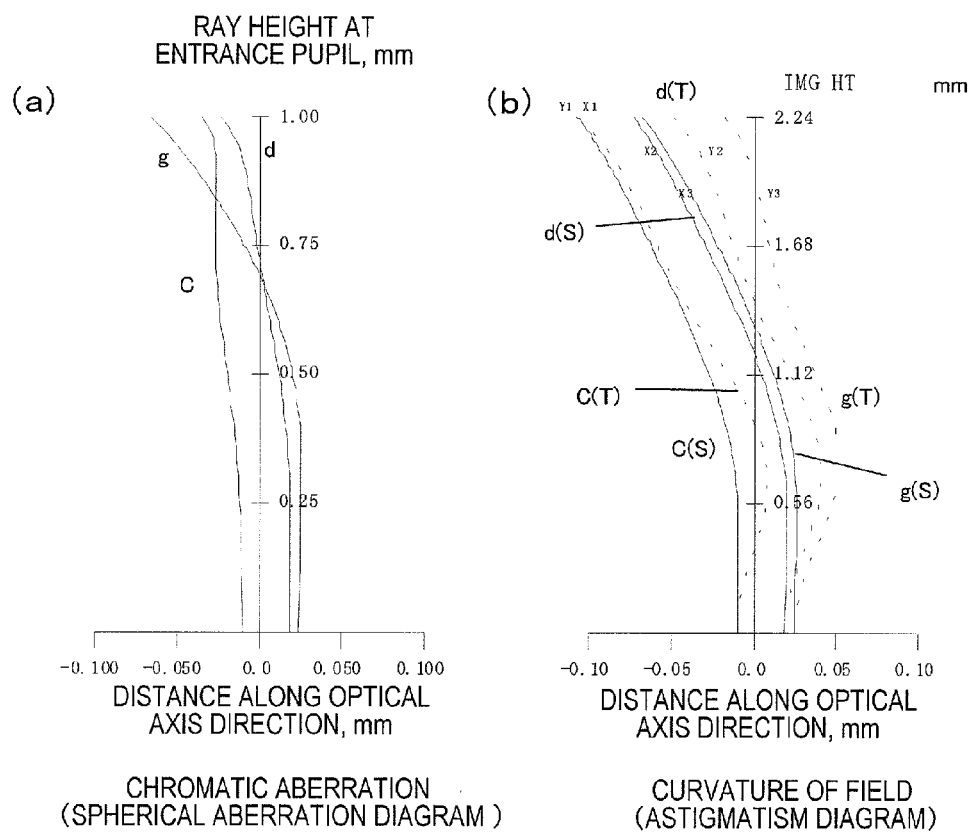
FIG. 14 (a) is a spherical aberration diagram of an imaging device according to Example 5 of the present invention; and (b) is an astigmatism diagram of an imaging device according to Example 5 of the present invention.

FIG. 14(a) is a spherical aberration diagram showing the chromatic aberration of Example 5; and FIG. 14(b) is an astigmatism diagram showing the amount of curvature of field of Example 5. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 14(b), it can be confirmed that the chromatic aberration is corrected even at high angles of view.

In Example 5, too, results similar to those of Example 1 were obtained regarding the changes in the RMS value of the spot size when the Abbe number of the convex lens 112 was varied, i.e., when the value of the constant P1 was varied, such that conditional expression (1) provided the optimum range irrespective of the varying Abbe number of the material of the convex lens 112.

Example 6

Figure 15:
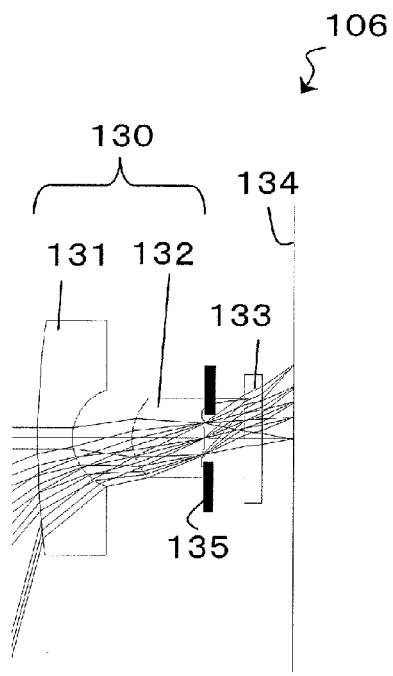
FIG. 15 A cross-sectional view showing an imaging device according to Example 6 of the present invention.

FIG. 15 is a cross-sectional view showing an imaging device 106 of Example 6. The imaging device 106 includes a double-lens imaging optical system 130, a cover glass 133, an imaging element 134, and a diaphragm 135. The double-lens imaging optical system 130 includes two lenses, i.e., a concave lens 131 and a convex lens 132.

The diaphragm 135 is disposed on the image plane side of the convex lens 132, and a diffraction grating 17 (FIG. 2) is formed on the envelope of the aspheric surface at the image side of the convex lens 132. Moreover, the concave lens 131 is made of a glass material for enhanced impact resistance.

Numerical data of the imaging device 106 of Example 6 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=152°
Fno=2.8
L=7.9 mm
f=1.8507 mm
$f_a$=2.1077 mm
Cl₁=3.076 mm
Cl₂=1.476 mm
h=2.25 mm
Ds=-69.1%

| surface number | R | t | $n_d$ | $v_d$ |
|---|---|---|---|---|
| 1 | 28.92876 | 1.052185 | 1.689175 | 49.9 |
| 2 | 1.569439 | 1.841324 | | |
| 3 | 1.602864 | 2.230632 | 1.585000 | 50.0 |
| 4 | -3.382609 | 0.000000 | | |
| 5 (diaphragm) | infinite | 1.262623 | | |
| 6 | infinite | 0.550930 | BK7 | |
| 7 | infinite | 0.959707 | | |

```
(aspheric coefficient of third surface)

κ = 0
A = -0.0207991
B = 0.00797051
C = -0.0143581
D = 0.00277102
(aspheric coefficient of fourth surface)

κ = 0
A = 0.101217
B = -0.379935
C = 0.497135
D = 0.0302491
(phase factor of fourth surface)

m = 1
design wavelength λ = 538 nm
a₂ = -0.0226794
a₄ = -0.0341538
a₆ = 0.246544
a₈ = -0.335056
a₁₀ = -0.0309166
```

From the above numerical data,
P1=6.10;
P2=3.52; and
P3=3.93, indicating that conditional expression (1) is satisfied. Moreover, since a material having an Abbe number of 50 was used as the material of the convex lens 132, color correction by the diffraction grating can be less than those in Examples 1 to 4 where an Abbe number of 27.9 was used, thus resulting in a small $f_a$ value. Since the color correction by the diffraction grating 17 can be little, the number of annular zones in the diffraction grating 17 can be reduced, thus facilitating the lens processing.

Figure 16:
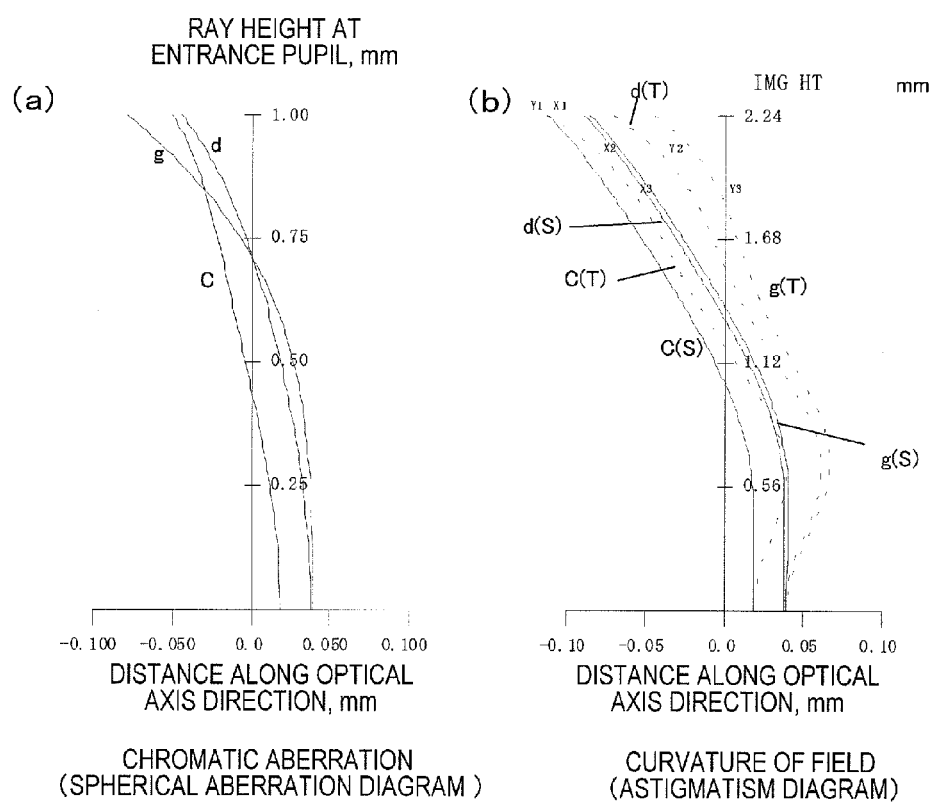
FIG. 16 (a) is a spherical aberration diagram of an imaging device according to Example 6 of the present invention; and (b) is an astigmatism diagram of an imaging device according to Example 6 of the present invention.

FIG. 16(*a*) is a spherical aberration diagram showing the chromatic aberration of Example 6; and FIG. 16(*b*) is an astigmatism diagram showing the amount of curvature of field of Example 6. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 16(*b*), it can be confirmed that the chromatic aberration is corrected even at high angles of view.

In Example 6, too, results similar to those of Example 1 were obtained regarding the changes in the RMS value of the spot size when the Abbe number of the convex lens 132 was varied, i.e., when the value of the constant P1 was varied, such that conditional expression (1) provided the optimum range irrespective of the varying Abbe number of the material of the convex lens 132.

Example 7

Figure 17:
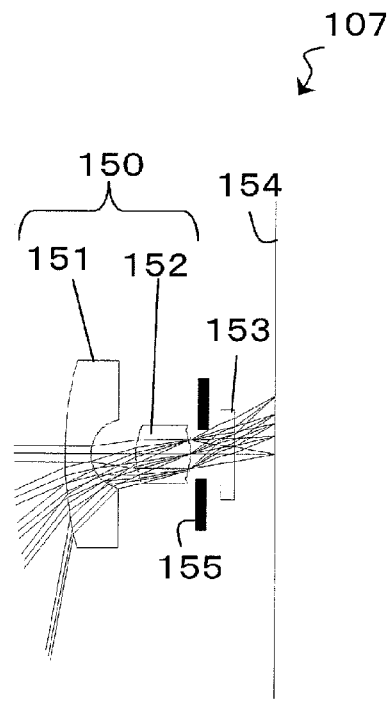
FIG. 17 A cross-sectional view showing an imaging device according to Example 7 of the present invention.

FIG. 17 is a cross-sectional view showing an imaging device 107 of Example 7. The imaging device 107 includes a double-lens imaging optical system 150, a cover glass 153, an imaging element 154, and a diaphragm 155. The double-lens imaging optical system 150 includes two lenses, i.e., a concave lens 151 and a convex lens 152.

The diaphragm 155 is disposed on the image plane side of the convex lens 152, and a diffraction grating 17 (FIG. 2) is formed on the envelope of the aspheric surface at the image side of the convex lens 152.

Numerical data of the imaging device 107 of Example 7 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=160°
Fno=2.8
L=8.2 mm
f=1.7551 mm
$f_a$=2.2676 mm
$Cl_1$=3.095 mm
$Cl_2$=1.330 mm
h=2.25 mm
Ds=−77.4%

| surface number | R | t | $n_d$ | $v_d$ |
|---|---|---|---|---|
| 1 | 14.43949 | 1.000572 | 1.692884 | 49.5 |
| 2 | 1.360261 | 1.751001 | | |
| 3 | 2.416304 | 2.121213 | 1.585000 | 27.9 |
| 4 | −2.280809 | 0.000000 | | |
| 5 (diaphragm) | infinite | 1.200687 | | |
| 6 | infinite | 0.523905 | BK7 | |
| 7 | infinite | 1.562170 | | |

(aspheric coefficient of third surface)

κ = 0
A = −0.0246606
B = 0.0110786
C = −0.0152781
D = 0.00395633

(aspheric coefficient of fourth surface)

κ = 0
A = 0.0209182
B = −0.0972182
C = 0.131207
D = 0.00969362

(phase factor of fourth surface)

m = 1
design wavelength λ = 538 nm
$a_2$ = −0.0352955
$a_4$ = 0.00404823
$a_6$ = 0.0426849
$a_8$ = −0.0273222
$a_{10}$ = −0.0774619

From the above numerical data,
P1=6.31;
P2=3.93; and
P3=5.67, indicating that conditional expression (1) is satisfied. Moreover, an imaging device with an angle of view ω as broad as 160° is being realized.

Figure 18:
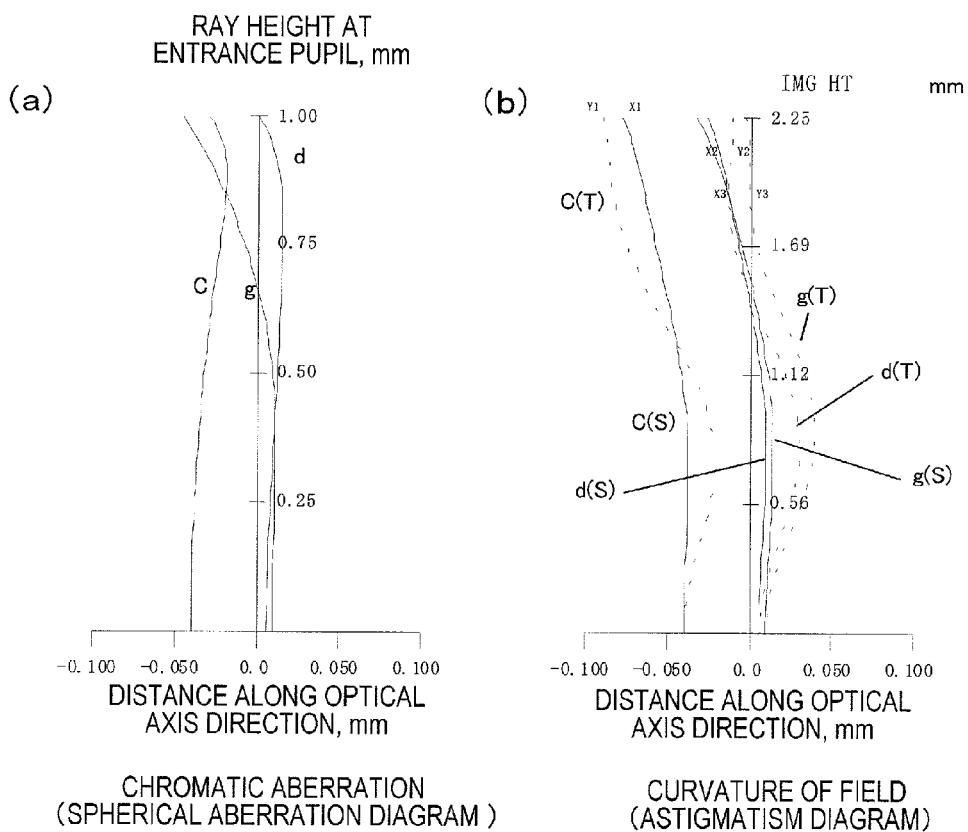
FIG. 18 (a) is a spherical aberration diagram of an imaging device according to Example 7 of the present invention; and (b) is an astigmatism diagram of an imaging device according to Example 7 of the present invention.

FIG. 18(*a*) is a spherical aberration diagram showing the chromatic aberration of Example 7; and FIG. 18(*b*) is an astigmatism diagram showing the amount of curvature of field of Example 7. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 18(*b*), it can be confirmed that the chromatic aberration is corrected even at high angles of view.

In Example 7, too, results similar to those of Example 1 were obtained regarding the changes in the RMS value of the spot size when the Abbe number of the convex lens 152 was varied, i.e., when the value of the constant P1 was varied.

Example 8

Figure 19:
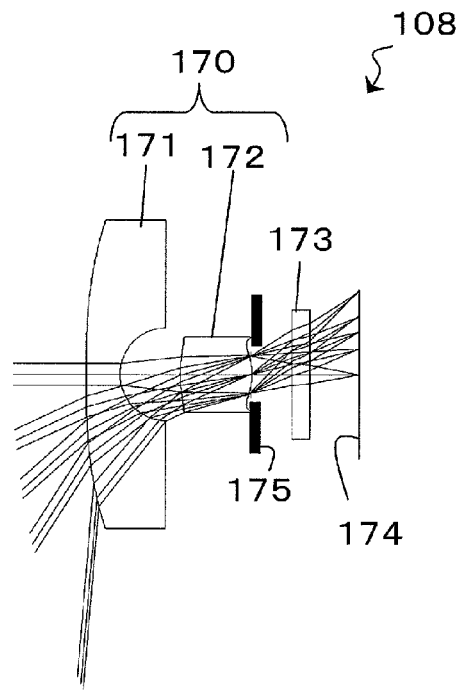
FIG. 19 A cross-sectional view showing an imaging device according to Example 8 of the present invention.

FIG. 19 is a cross-sectional view showing an imaging device 108 of Example 8. The imaging device 108 includes a double-lens imaging optical system 170, a cover glass 173, an imaging element 174, and a diaphragm 175. The double-lens imaging optical system 170 includes two lenses, i.e., a concave lens 171 and a convex lens 172.

The diaphragm 175 is disposed on the image plane side of the convex lens 172, and a diffraction grating 17 (FIG. 2) is formed on the envelope of the aspheric surface at the image side of the convex lens 172. Moreover, the concave lens 171 is an aspheric lens, which makes it possible to reduce occurrence of aberration.

Numerical data of the imaging device 108 of Example 8 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side Surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=170°
Fno=2.8
L=7.4 mm
f=1.6378 mm
$f_a$=2.0342 mm
$Cl_1$=3.602 mm
$Cl_2$=1.268 mm
h=2.25 mm
Ds=−88.0%

| surface number | R | t | $n_d$ | $v_d$ |
|---|---|---|---|---|
| 1 | 55.04482 | 0.927249 | 1.524700 | 56.2 |
| 2 | 1.343455 | 1.622685 | | |
| 3 | 3.021424 | 1.965768 | 1.585000 | 27.9 |
| 4 | −1.789619 | −0.0231812 | | |
| 5 (diaphragm) | infinite | 1.112699 | | |
| 6 | infinite | 0.485513 | BK7 | |
| 7 | infinite | 1.339597 | | |

(aspheric coefficient of first surface)

κ = −81
A = 0.00317541422078672
B = −0.000185006549754633
C = 3.5799478951393e−006
(aspheric coefficient of second surface)

κ = 0.121
A = 0.0193631187128404
B = 0.0137489674549004
C = −0.0262033221814269
D = 0.014241538433391
(aspheric coefficient of third surface)

κ = −3.31
A = −0.0145830909159257
B = −0.0262302077166413
C = 0.0164083018337394
D = −0.0183030159253571
(aspheric coefficient of fourth surface)

κ = −1.5
A = 0.0101082085491435
B = −0.284209744973213

-continued

C = 0.68688385250565
D = −0.174221245283431
(phase factor of fourth surface)

m = 1
design wavelength λ = 538 nm
$a_2$ = −0.0343806431149507
$a_4$ = −0.0224131119745009
$a_6$ = 0.262818041720287
$a_8$ = −0.572421611379851

From the above numerical data,
P1=5.44;
P2=4.33; and
P3=11.43, indicating that conditional expression (1) is satisfied. Moreover, an imaging device with an angle of view ω as broad as 170° is being realized. Moreover, the optical length L is as short as 7.4 mm, which permits a corresponding decrease in the thickness of the imaging device.

Figure 20:
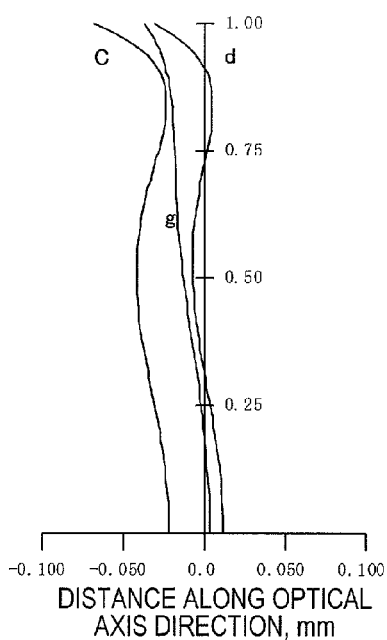
FIG. 20 (a) is a spherical aberration diagram of an imaging device according to Example 8 of the present invention; and (b) is an astigmatism diagram of an imaging device according to Example 8 of the present invention.
Figure 20:
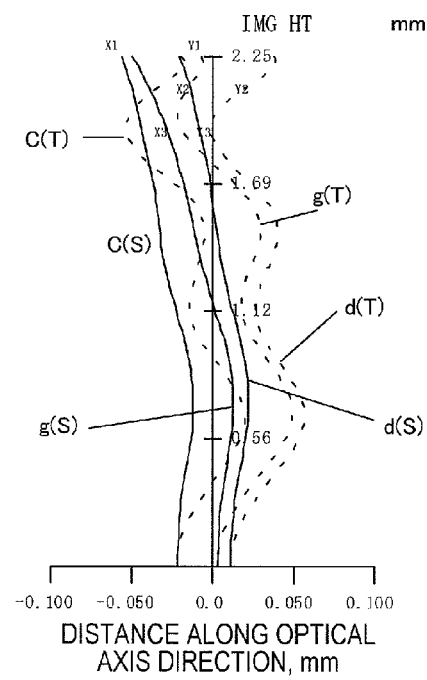

FIG. 20(a) is a spherical aberration diagram showing the chromatic aberration of Example 8; and FIG. 20(b) is an astigmatism diagram showing the amount of curvature of field of Example 8. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration. In the astigmatism diagram, the horizontal axis represents a distance along the optical axis direction and the vertical axis represents an image height. Therefore, the distance from the vertical axis is the amount of curvature of field aberration at each image height. Herein, T means tangential, and S means sagittal, respectively shown by dotted-lines and solid-lines.

From the astigmatism diagram of FIG. 20(b), it can be confirmed that the chromatic aberration is corrected even at high angles of view.

In Example 8, too, results similar to those of Example 1 were obtained regarding the changes in the RMS value of the spot size when the Abbe number of the convex lens 172 was varied, i.e., when the value of the constant P1 was varied.

Example 9

Figure 21:
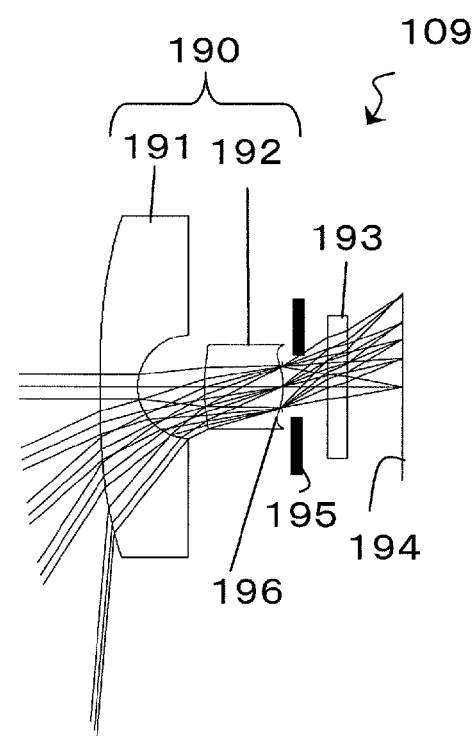
FIG. 21 A cross-sectional view showing an imaging device according to Example 9 of the present invention.

FIG. 21 is a cross-sectional view showing an imaging device 109 of Example 9. The imaging device 109 includes a double-lens imaging optical system 190, a cover glass 193, an imaging element 194, and a diaphragm 195. The double-lens imaging optical system 190 includes two lenses, i.e., a concave lens 191 and a convex lens 192.

The convex lens 192 is a lens obtained by adding a protection film 196 covering the diffraction grating 17 to the convex lens 22 (FIG. 4) of Example 1. The protection film 196 corresponds to the protection film 18 shown in FIG. 2(c).

Numerical data of the imaging device 109 of Example 9 is shown below. In the following data, ω is a total angle of view; Fno is an aperture ratio; L is an optical length (distance from the apex of the object-side surface of the concave lens to the image plane); R is a radius of curvature of the surface [mm]; t is an inter-surface interval (distance between plane centers along the optical axis) [mm]; $n_d$ is a refractive index of the substrate with respect to the d-line; and $v_d$ is an Abbe number of the substrate with respect to the d-line. Surface numbers 1, 2, 3, 4, 5, 6, and 7 are, respectively, an object-side surface of the concave lens, an image-side surface of the concave lens, an object-side surface of the convex lens, an image-side surface of the convex lens, the diaphragm, an object-side surface of the cover glass, and an image-side surface of the cover glass. Moreover, m is an order of diffraction.

ω=151°
Fno=2.8
L=8.6 mm
f=1.8468 mm
$f_a$=2.3542 mm
$Cl_1$=3.2247 mm
$Cl_2$=1.3931 mm
h=2.25 mm
Ds=−69.2%

| surface number | R | t | $n_d$ | $v_d$ |
|---|---|---|---|---|
| 1 | 16.09058 | 1.052185 | 1.689175 | 49.9 |
| 2 | 1.439873 | 1.841324 | | |
| 3 | 2.559651 | 2.230632 | 1.585000 | 27.9 |
| 4 | −2.36292 | 0.030000 | 1.623000 | 40.0 |
| 5 | −2.36292 | 0.000000 | | |
| 6 (diaphragm) | infinite | 1.262623 | | |
| 7 | infinite | 0.550930 | BK7 | |
| 8 | infinite | 1.638462 | | |

(aspheric coefficient of third surface)

κ = 0
A = −0.0189257
B = 0.00394453
C = −0.00835334
D = 0.00196203
(aspheric coefficient of fourth surface)

κ = 0
A = 0.0382578
B = −0.167936
C = 0.251343
D = −0.0818271
(aspheric coefficient of fifth surface)

κ = 0
A = 0.0382578
B = −0.167936
C = 0.251343
D = −0.0818271
(phase factor of fourth surface)

m = 1
design wavelength λ = 538 nm
$a_2$ = −0.0321500
$a_4$ = −0.00920476
$a_6$ = 0.0948648
$a_8$ = −0.127040
$a_{10}$ = 0.00954808

From the above numerical data,
P1=6.01;
P2=3.91; and
P3=3.96, indicating that conditional expression (1) is satisfied.

As for the chromatic aberration and the amount of curvature of field of the imaging device 109 of Example 9, the same results as the results shown in FIG. 5(a) and FIG. 5(b) were obtained.

As the material of the convex lens 192, polycarbonate (d-line refractive index 1.585, d-line Abbe number 27.9) was used. As the material of the protection film 196, a resin (d-line refractive index 1.623, d-line Abbe number 40.0) obtained by dispersing zirconium oxide with a particle size of 10 nm or less in an acrylic-type UV-curing resin was used. The diffraction grating 17 had a depth of 15 μm.

Figure 22:
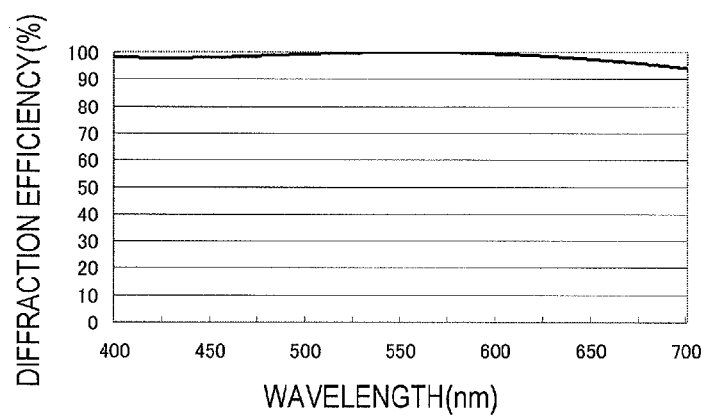
FIG. 22 A graph showing a wavelength dependence of diffraction efficiency of an imaging device according to Example 9 of the present invention.

FIG. 22 is a graph showing wavelength dependence of the 1st-order diffraction efficiency of the imaging device 109 of Example 9. From FIG. 22, it can be seen that the diffraction efficiency is 95% or more (which may essentially be considered as 100%) in the entire visible light region spanning wavelengths from 400 nm to 700 nm, indicative that the wavelength dependence of diffraction efficiency is successfully reduced by the protection film 196.

Although it is desirable to add the protection film 196 on the diffraction grating 17 for being able to maintain a quite high diffraction efficiency across a wide wavelength region, it is not essentially required. Even if it is omitted, the diffraction efficiency can be maintained at about 80% or more, and advantages of shallow blaze depth and simple construction are obtained.

Figure 23:
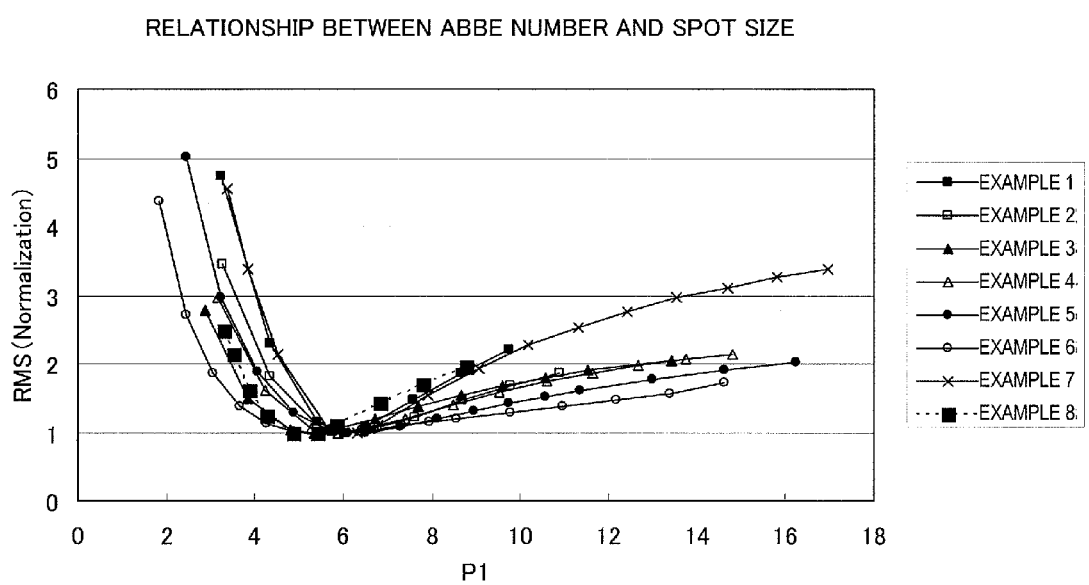
FIG. 23 A graph showing relationships between RMS values and P1 values of spot sizes of imaging devices according to Examples 1 to 8 of the present invention.

FIG. 23 is a graph showing specification limits for the RMS value in Examples 1 to 9. It is normalized based on the minimum value in each Example.

The RMS value is a 1σ value of a ray passing through the entrance pupil; a smaller RMS value indicates a better lens performance; and an ideal design is where the RMS value of the spot size (diameter) equals the pixel size (1 pixel) of the imaging element. The specification limit for the RMS value being 2 means that the spot extends as far as the center positions of the adjoining pixels on both right and left sides. If the specification limit exceeds 2, the spot will go beyond the center positions of the adjoining pixels on both sides, thus affecting the performance. Therefore, it must be ensured that the RMS value is within twice the value which defines the minimum value in the lens data of each set of specifications of Examples 1 to 9. In this case, the P1 range is 4.5<P1<9.0 from FIG. 23. More preferably, the RMS value is less than 1.5 times the minimum value, so that the influence on the adjoining pixels on both sides becomes less and the influence of chromatic aberration will be less conspicuous. In this case, the P1 range is 5.0<P1<7.3. Even more preferably, the RMS value is less than 1.2 times the minimum value, in which case the P1 range is 5.2<P1<6.8. In this state, too, the decrease in resolution can be suppressed to within 5 to 15% of the optimum state (RMS value 1), whereby a good lens performance close to that in the optimum state is obtained.

Next, Comparative Examples against the above Examples 1 to 9 will be described.

Comparative Example 1

Figure 24:
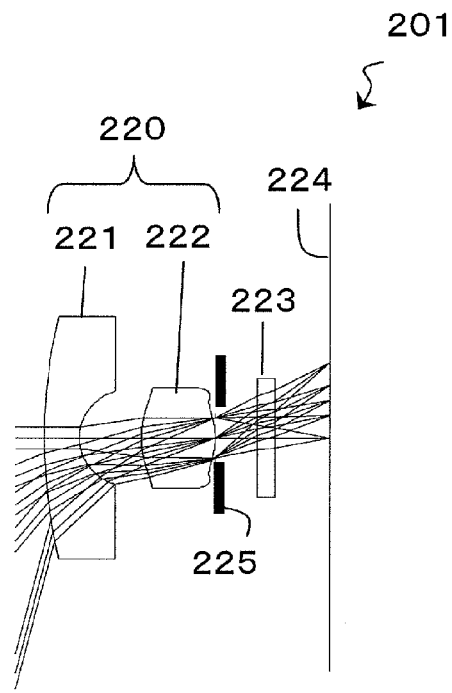
FIG. 24 A cross-sectional view showing an imaging device of Comparative Example 1.

FIG. 24 is a cross-sectional view showing an imaging device 201 of Comparative Example 1. The imaging device 201 includes a double-lens imaging optical system 220, a cover glass 223, an imaging element 224, and a diaphragm 225. The double-lens imaging optical system 220 includes two lenses, i.e., a concave lens 221 and a convex lens 222. The imaging device 201 is an imaging device obtained by changing the Abbe number of the convex lens 22 (FIG. 4) of the imaging device 101 of Example 1 from 27.9 to 20.

Since P1=4.33 under the conditions of Comparative Example 1, the P1 value is lower than the lower limit value of 4.5 under conditional expression (1). The specification limit for the RMS value of the spot size of Comparative Example 1 is 2.30, indicative of a too large spot size and poor performance.

Figure 25:
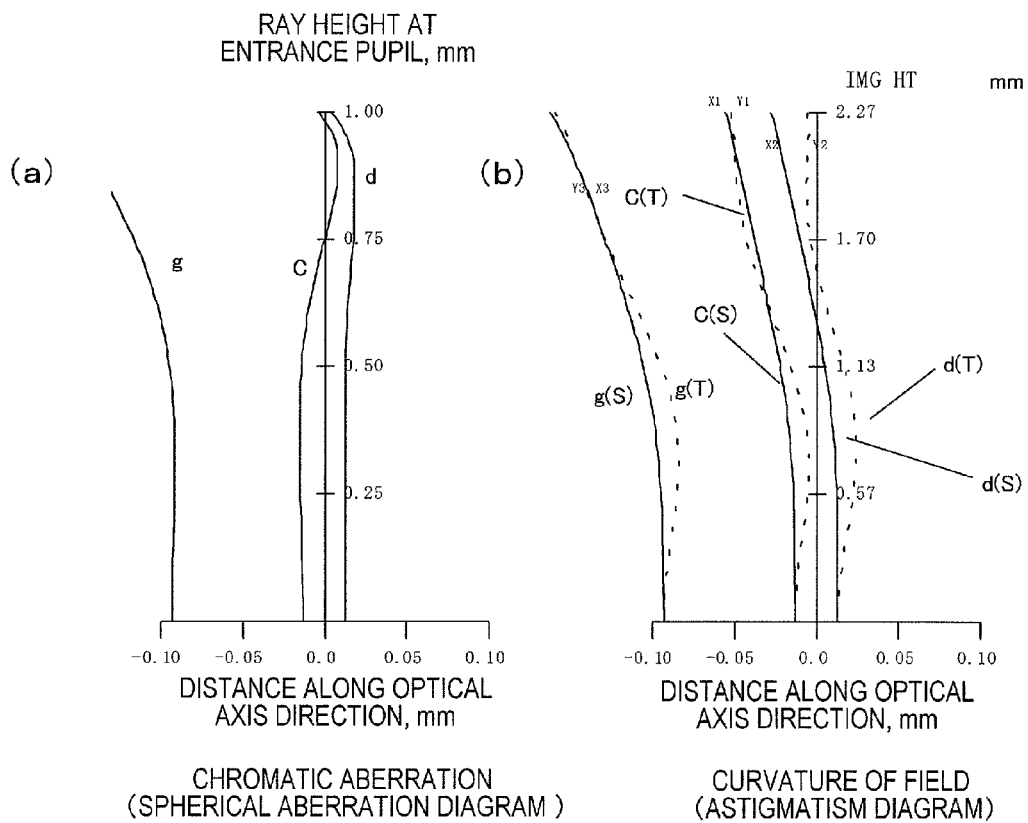
FIG. 25 (a) is a spherical aberration diagram of an imaging device of Comparative Example 1; and (b) is an astigmatism diagram of an imaging device of Comparative Example 1.

FIG. 25(a) is a spherical aberration diagram showing chromatic aberration of Comparative Example 1, and FIG. 25(b) is an astigmatism diagram showing an amount of curvature of field of Comparative Example 1. As can be seen from FIG. 25(a) and FIG. 25(b), this is a state of insufficient color correction, resulting in a large spot width at unfocused wavelengths.

Comparative Example 2

Figure 26:
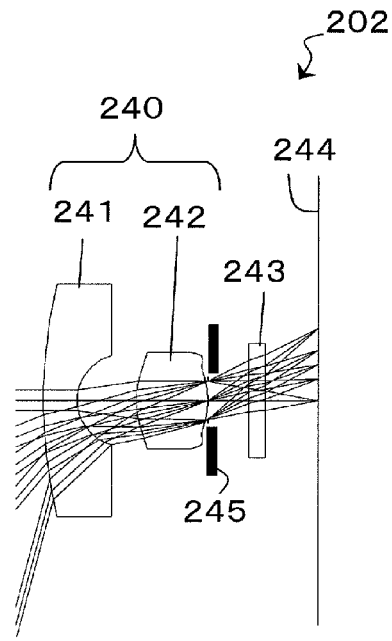
FIG. 26 A cross-sectional view showing an imaging device of Comparative Example 2.

FIG. 26 is a cross-sectional view showing an imaging device 202 of Comparative Example 2. The imaging device 202 includes a double-lens imaging optical system 240, a cover glass 243, an imaging element 244, and a diaphragm 245. The double-lens imaging optical system 240 includes two lenses, i.e., a concave lens 241 and a convex lens 242. The imaging device 202 is an imaging device obtained by changing the Abbe number of the convex lens 22 (FIG. 4) of the imaging device 101 of Example 1 from 27.9 to 45.

Since P1=9.74 under the conditions of Comparative Example 2, the P1 value exceeds the upper limit value of 9.0 under conditional expression (1). The specification limit for the RMS value of the spot size of Comparative Example 2 is 2.20, indicative of a too large spot size and poor performance.

Figure 27:
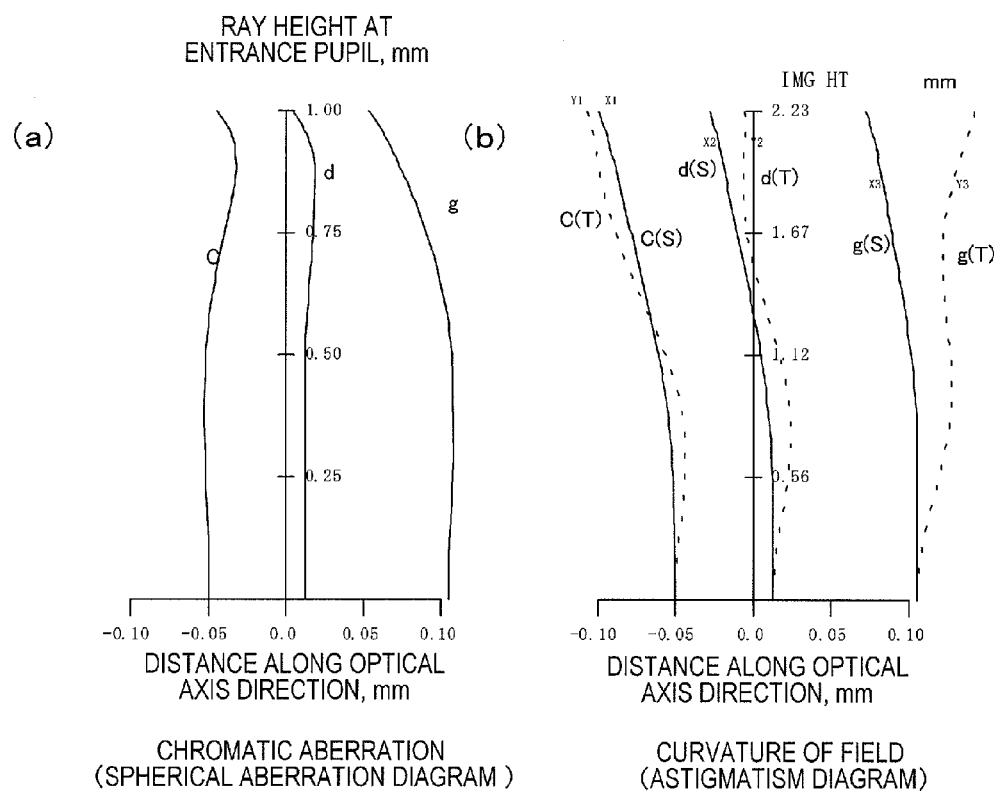
FIG. 27 (a) is a spherical aberration diagram of an imaging device of Comparative Example 2; and (b) is an astigmatism diagram of an imaging device of Comparative Example 2.

FIG. 27(a) is a spherical aberration diagram showing chromatic aberration of Comparative Example 2, and FIG. 27(b) is an astigmatism diagram showing an amount of curvature of field of Comparative Example 2. As can be seen from FIG. 27(a) and FIG. 27(b), this is a state of excessive color correction, resulting in a large spot width of unfocused wavelengths.

INDUSTRIAL APPLICABILITY

The present invention is particularly useful in technological fields where shooting with a super wide angle is desired. For example, it is particularly useful in the fields of onboard cameras and surveillance cameras.

REFERENCE SIGNS LIST 11, 21, 51, 71, 91, 111, 131, 151, 171, 191, 221, 241 concave lens
12, 22, 52, 72, 92, 112, 132, 152, 172, 192, 222, 242 convex lens
13, 23, 53, 73, 93, 113, 133, 153, 173, 193, 223, 243 cover glass
14, 24, 54, 74, 94, 114, 134, 154, 174, 194, 224, 244 imaging element
15, 25, 55, 75, 95, 115, 135, 155, 175, 195, 225, 245 diaphragm
16 light
17 diffraction grating
18, 196 protection film
10, 20, 50, 70, 90, 110, 130, 150, 170, 190, 220, 240 double-lens imaging optical system
100, 101, 102, 103, 104, 105, 106, 107, 108, 109, 201, 202 imaging device

The invention claimed is:

1. A double-lens imaging optical system comprising:
a meniscus concave lens; and
a convex lens having a diffraction grating provided thereon, wherein the double-lens imaging optical system satisfies the following expression (1):

$$4.5 < P1 = (1 - f/f_a) \cdot v_d < 9.0 \qquad (1),$$

where f is an effective focal length of the double-lens imaging optical system; $f_a$ is an effective focal length of the double-lens imaging optical system excluding the diffraction grating; and $v_d$ is an Abbe number of a material of the convex lens with respect to the d-line, wherein,
an angle of view is 145° or more;
the meniscus concave lens satisfies the following expression (4):

$$2.8 < P2 = (Cl_1/Cl_2) - n_{d1} < 4.5 \qquad (4),$$

where $Cl_1$ is an effective radius of an imaging target-side surface of the meniscus concave lens; $Cl_2$ is an effective radius of an image-side surface of the meniscus concave lens; and $n_{d1}$ is a refractive index of the meniscus concave lens with respect to the d-line.

2. The double-lens imaging optical system of claim 1, wherein the double-lens imaging optical system satisfies the following expression (2):

$$5.0 < P1 = (1 - f/f_a) \cdot v_d < 7.3 \qquad (2).$$

3. The double-lens imaging optical system of claim 1, wherein the double-lens imaging optical system satisfies the following expression (3):

$$5.2 < P1 = (1 - f/f_a) \cdot v_d < 6.8 \qquad (3).$$

4. The double-lens imaging optical system of claim 1, wherein the meniscus concave lens satisfies the following expression (5):

$$n_{d1} > 1.5 \qquad (5).$$

5. The double-lens imaging optical system of claim 1, wherein,
the double-lens imaging optical system satisfies the following expression (6):

$$P3 = h/[(1 - |Ds|/100) \cdot f] > 3.4 \qquad (6),$$

where h is an image height; and Ds is a distortion value of the double-lens imaging optical system.

6. The double-lens imaging optical system of claim 1, wherein the concave lens is made of a glass material.

7. The double-lens imaging optical system of claim 6, wherein surfaces of the concave lens are both spherical-shaped.

8. The double-lens imaging optical system of claim 1, wherein the diffraction grating is provided on one of two surfaces of the convex lens, and not on the other surface.

9. An imaging device comprising:
the double-lens imaging optical system of claim 1;
a diaphragm defining an angle of view and an incident light amount of the double-lens imaging optical system; and
an imaging element on which to receive an image formed by the double-lens imaging optical system.

* * * * *